(12) United States Patent
Thoresz et al.

(10) Patent No.: US 11,812,096 B2
(45) Date of Patent: Nov. 7, 2023

(54) ACCESS CONTROL TECHNIQUES FOR MEDIA PLAYBACK SYSTEMS

(71) Applicant: Sonos, Inc., Santa Barbara, CA (US)

(72) Inventors: Keith Thoresz, Belmont, MA (US); Nathan Fish, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 18/157,601

(22) Filed: Jan. 20, 2023

(65) Prior Publication Data

US 2023/0156270 A1    May 18, 2023

Related U.S. Application Data

(63) Continuation of application No. 17/527,887, filed on Nov. 16, 2021, now Pat. No. 11,570,510, which is a
(Continued)

(51) Int. Cl.
*H04N 21/436* (2011.01)
*H04N 21/482* (2011.01)
(Continued)

(52) U.S. Cl.
CPC ....... *H04N 21/43615* (2013.01); *G06F 3/167* (2013.01); *H04N 21/4415* (2013.01); *H04N 21/4825* (2013.01); *H04N 21/8113* (2013.01)

(58) Field of Classification Search
CPC ......... H04N 21/43615; H04N 21/4415; H04N 21/4825; H04N 21/8113; G06F 3/167
See application file for complete search history.

(56) References Cited

U.S. PATENT DOCUMENTS 5,406,634 A   4/1995   Anderson et al.
5,440,644 A   8/1995   Farinelli et al.
(Continued)

FOREIGN PATENT DOCUMENTS

EP    1389853 A1     2/2004
KR    20090017795    2/2009
(Continued)

OTHER PUBLICATIONS

Notice of Allowance dated Nov. 15, 2022, issued in connection with U.S. Appl. No. 17/527,887, filed Nov. 16, 2021, 9 pages.
(Continued)

*Primary Examiner* — Chenea Davis
(74) *Attorney, Agent, or Firm* — Fortem IP LLP; Benjamin Urban

(57) ABSTRACT

Example access control techniques described herein are intended to enable guest access for a media playback system while maintaining security of the media playback system. An example implementation involves a computing device receiving a request to control a media playback system comprising a playback device. After receiving the request, the computing device obtains access to the media playback system. Obtaining access may involve obtaining a first identifier associated with the media playback system, obtaining a second identifier using the first identifier over a wide area network (WAN) with a computing system, and obtaining a token using the second identifier over the WAN with the computing system. The example implementation further involves receiving a request for the media playback system to perform an operation and causing the media playback system to perform the operation using the token.

20 Claims, 15 Drawing Sheets

Related U.S. Application Data continuation of application No. 16/372,014, filed on Apr. 1, 2019, now Pat. No. 11,184,666.

(51) Int. Cl.
*H04N 21/4415* (2011.01)
*G06F 3/16* (2006.01)
*H04N 21/81* (2011.01)

(56) References Cited

U.S. PATENT DOCUMENTS

| | | |
|---|---|---|
| 5,761,320 A | 6/1998 | Farinelli et al. |
| 5,856,827 A | 1/1999 | Sudo |
| 5,923,902 A | 7/1999 | Inagaki |
| 6,002,862 A | 12/1999 | Takaike |
| 6,032,202 A | 2/2000 | Lea et al. |
| 6,181,316 B1 | 1/2001 | Little et al. |
| 6,255,961 B1 | 7/2001 | Van Ryzin et al. |
| 6,256,554 B1 | 7/2001 | DiLorenzo |
| 6,404,811 B1 | 6/2002 | Cvetko et al. |
| 6,469,633 B1 | 10/2002 | Wachter |
| 6,522,886 B1 | 2/2003 | Youngs et al. |
| 6,587,127 B1 | 7/2003 | Leeke et al. |
| 6,611,537 B1 | 8/2003 | Edens et al. |
| 6,631,410 B1 | 10/2003 | Kowalski et al. |
| 6,728,531 B1 | 4/2004 | Lee et al. |
| 6,732,155 B2 | 5/2004 | Meek |
| 6,757,517 B2 | 6/2004 | Chang |
| 6,778,869 B2 | 8/2004 | Champion |
| 6,826,283 B1 | 11/2004 | Wheeler et al. |
| 6,892,307 B1 | 5/2005 | Wood et al. |
| 6,985,694 B1 | 1/2006 | De Bonet et al. |
| 7,017,118 B1 | 3/2006 | Carroll |
| 7,020,048 B2 | 3/2006 | Mccomas |
| 7,113,833 B1 | 9/2006 | Brown et al. |
| 7,117,451 B2 | 10/2006 | Sielken |
| 7,130,608 B2 | 10/2006 | Hollstrom et al. |
| 7,130,616 B2 | 10/2006 | Janik |
| 7,143,939 B2 | 12/2006 | Henzerling |
| 7,187,947 B1 | 3/2007 | White et al. |
| 7,236,773 B2 | 6/2007 | Thomas |
| 7,295,548 B2 | 11/2007 | Blank et al. |
| 7,312,785 B2 | 12/2007 | Tsuk et al. |
| 7,358,960 B2 | 4/2008 | Mak |
| 7,391,791 B2 | 6/2008 | Balassanian et al. |
| 7,483,538 B2 | 1/2009 | Mccarty et al. |
| 7,571,014 B1 | 8/2009 | Ambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,742,740 B2 | 6/2010 | Goldberg et al. |
| 7,805,682 B1 | 9/2010 | Lambourne |
| 7,853,341 B2 | 12/2010 | Mccarty et al. |
| 7,899,187 B2 | 3/2011 | Messerges et al. |
| 7,975,312 B2 | 7/2011 | Broderson et al. |
| 7,987,294 B2 | 7/2011 | Bryce et al. |
| 8,014,423 B2 | 9/2011 | Thaler et al. |
| 8,045,952 B2 | 10/2011 | Qureshey et al. |
| 8,050,652 B2 | 11/2011 | Qureshey et al. |
| 8,074,253 B1 | 12/2011 | Nathan |
| 8,103,009 B2 | 1/2012 | Mccarty et al. |
| 8,131,390 B2 | 3/2012 | Braithwaite et al. |
| 8,234,395 B2 | 7/2012 | Millington |
| 8,387,124 B2 | 2/2013 | Smetters et al. |
| 8,483,853 B1 | 7/2013 | Lambourne |
| 8,590,028 B2 | 11/2013 | Saxena et al. |
| 8,615,794 B1 | 12/2013 | Tomilson et al. |
| 8,831,570 B2 | 9/2014 | Garskof |
| 8,880,098 B2 | 11/2014 | Shobatake |
| 8,910,265 B2 | 12/2014 | Lang et al. |
| 8,942,252 B2 | 1/2015 | Balassanian et al. |
| 8,955,069 B1 | 2/2015 | Dotan et al. |
| 8,959,598 B2 | 2/2015 | Smith |
| 8,977,679 B2 * | 3/2015 | Van Biljon ............ H04M 15/66 714/4.11 |
| 9,043,492 B2 | 5/2015 | A. R. et al. |
| 9,065,819 B1 | 6/2015 | Shanmugam et al. |
| 9,137,564 B2 | 9/2015 | Reimann |
| 9,143,492 B2 | 9/2015 | Redberg et al. |
| 9,178,962 B2 | 11/2015 | Le et al. |
| 9,185,445 B2 | 11/2015 | Kirksey |
| 9,223,862 B2 | 12/2015 | Beckhardt |
| 9,226,072 B2 | 12/2015 | Bender et al. |
| 9,232,277 B2 | 1/2016 | Vega-Zayas et al. |
| 9,235,715 B1 | 1/2016 | Bailey et al. |
| 9,264,413 B2 | 2/2016 | Zhang |
| 9,286,384 B2 | 3/2016 | Kuper et al. |
| 9,361,371 B2 | 6/2016 | Coburn, IV et al. |
| 9,374,356 B2 | 6/2016 | Sondhi et al. |
| 9,374,607 B2 | 6/2016 | Bates et al. |
| 9,386,014 B2 | 7/2016 | Redberg et al. |
| 9,402,093 B2 | 7/2016 | Lieu et al. |
| 9,411,942 B2 | 8/2016 | Commons et al. |
| 9,460,755 B2 | 10/2016 | Coburn, IV |
| 9,495,076 B2 | 11/2016 | Kumar et al. |
| 9,501,533 B2 | 11/2016 | Coburn, IV et al. |
| 9,531,697 B2 | 12/2016 | Sondhi et al. |
| 9,531,833 B2 | 12/2016 | Le et al. |
| 9,544,294 B2 | 1/2017 | Srinivasan et al. |
| 9,578,014 B2 | 2/2017 | Sondhi et al. |
| 9,654,821 B2 | 5/2017 | Coburn, IV et al. |
| 9,674,587 B2 | 6/2017 | Triplett et al. |
| 9,684,484 B2 | 6/2017 | Kumar et al. |
| 9,703,521 B2 | 7/2017 | Kumar et al. |
| 9,735,978 B2 | 8/2017 | Kumar et al. |
| 9,787,684 B2 | 10/2017 | Neafsey et al. |
| 9,798,510 B2 | 10/2017 | Kumar et al. |
| 9,813,400 B2 | 11/2017 | Ross et al. |
| 9,860,234 B2 | 1/2018 | Sondhi et al. |
| 9,871,778 B1 | 1/2018 | Taralika et al. |
| 9,876,780 B2 | 1/2018 | Kuper et al. |
| 9,888,276 B2 | 2/2018 | Bolin |
| 9,953,179 B2 | 4/2018 | Kumar et al. |
| 9,977,561 B2 | 5/2018 | Bates et al. |
| 10,057,763 B2 | 8/2018 | Redberg et al. |
| 10,102,510 B2 | 10/2018 | Yau et al. |
| 10,116,652 B2 | 10/2018 | Kuper et al. |
| 10,148,637 B2 | 12/2018 | Taralika et al. |
| 10,382,203 B1 | 8/2019 | Loladia et al. |
| 10,462,505 B2 | 10/2019 | Coburn, IV et al. |
| 10,498,833 B2 | 12/2019 | Schulert |
| 10,547,608 B2 | 1/2020 | Kuper et al. |
| 10,708,259 B2 | 7/2020 | Vongsouvanh et al. |
| 10,715,973 B2 | 7/2020 | Kumar et al. |
| 10,757,824 B1 | 8/2020 | Yueh et al. |
| 11,134,076 B2 | 9/2021 | Kuper et al. |
| 11,394,712 B2 | 7/2022 | Monica et al. |
| 2001/0042107 A1 | 11/2001 | Palm |
| 2002/0002039 A1 | 1/2002 | Qureshey et al. |
| 2002/0022453 A1 | 2/2002 | Balog et al. |
| 2002/0026442 A1 | 2/2002 | Lipscomb et al. |
| 2002/0077984 A1 | 6/2002 | Ireton |
| 2002/0124097 A1 | 9/2002 | Isely et al. |
| 2002/0146237 A1 | 10/2002 | Safadi |
| 2002/0165921 A1 | 11/2002 | Sapieyevski |
| 2002/0178191 A1 | 11/2002 | Sielken |
| 2003/0023741 A1 | 1/2003 | Tomassetti et al. |
| 2003/0060189 A1 | 3/2003 | Minear et al. |
| 2003/0157951 A1 | 8/2003 | Hasty, Jr. |
| 2003/0198257 A1 | 10/2003 | Sullivan et al. |
| 2003/0210796 A1 | 11/2003 | Mccarty et al. |
| 2004/0024478 A1 | 2/2004 | Hans et al. |
| 2004/0024688 A1 | 2/2004 | Bi et al. |
| 2004/0025185 A1 | 2/2004 | Goci et al. |
| 2004/0078383 A1 | 4/2004 | Mercer et al. |
| 2004/0078812 A1 | 4/2004 | Calvert |
| 2004/0215611 A1 | 10/2004 | Jawa et al. |
| 2004/0261040 A1 | 12/2004 | Radcliffe et al. |
| 2005/0028225 A1 | 2/2005 | Dawson et al. |
| 2005/0108320 A1 | 5/2005 | Lord et al. |
| 2005/0108413 A1 | 5/2005 | Melmon |
| 2005/0155072 A1 | 7/2005 | Kaczowka et al. |
| 2005/0166157 A1 | 7/2005 | Ollis et al. |
| 2005/0262253 A1 | 11/2005 | Li et al. |

(56) References Cited

U.S. PATENT DOCUMENTS

| | | |
|---|---|---|
| 2006/0085862 A1 | 4/2006 | Witt et al. |
| 2006/0107237 A1 | 5/2006 | Kim |
| 2006/0168340 A1 | 7/2006 | Heller et al. |
| 2006/0253782 A1 | 11/2006 | Stark et al. |
| 2007/0038999 A1 | 2/2007 | Millington |
| 2007/0136778 A1 | 6/2007 | Birger et al. |
| 2007/0142944 A1 | 6/2007 | Goldberg et al. |
| 2007/0220430 A1 | 9/2007 | Sato |
| 2007/0250636 A1 | 10/2007 | Stephens |
| 2007/0288470 A1 | 12/2007 | Kauniskangas et al. |
| 2008/0005690 A1 | 1/2008 | Van Vugt |
| 2008/0016465 A1 | 1/2008 | Foxenland |
| 2008/0092204 A1 | 4/2008 | Bryce et al. |
| 2008/0134256 A1 | 6/2008 | Dacosta |
| 2008/0168568 A1 | 7/2008 | Brodersen et al. |
| 2008/0250062 A1 | 10/2008 | Huang et al. |
| 2008/0289006 A1 | 11/2008 | Hock et al. |
| 2009/0222907 A1 | 9/2009 | Guichard |
| 2009/0228919 A1 | 9/2009 | Zott et al. |
| 2010/0076971 A1 | 3/2010 | Barish et al. |
| 2010/0082731 A1 | 4/2010 | Haughay et al. |
| 2010/0131567 A1 | 5/2010 | Dorogusker et al. |
| 2010/0202755 A1 | 8/2010 | Ariya |
| 2010/0284389 A1 | 11/2010 | Ramsay et al. |
| 2011/0179455 A1 | 7/2011 | Thompson |
| 2011/0264732 A1 | 10/2011 | Robbin et al. |
| 2012/0117586 A1 | 5/2012 | Mccoy et al. |
| 2012/0304233 A1 | 11/2012 | Roberts et al. |
| 2013/0347117 A1 | 12/2013 | Parks et al. |
| 2014/0052770 A1 | 2/2014 | Gran et al. |
| 2014/0068328 A1 | 3/2014 | Jain et al. |
| 2014/0096219 A1 | 4/2014 | Lang et al. |
| 2014/0122695 A1 | 5/2014 | Kulikov et al. |
| 2014/0149544 A1 | 5/2014 | Le Nerriec et al. |
| 2014/0181947 A1 | 6/2014 | Lund |
| 2014/0277639 A1 | 9/2014 | Gomes-Casseres et al. |
| 2014/0279519 A1 | 9/2014 | Mattes et al. |
| 2014/0282882 A1 | 9/2014 | Tsui et al. |
| 2014/0330885 A1 | 11/2014 | Schulert |
| 2015/0256600 A1 | 9/2015 | Dakhane et al. |
| 2015/0358310 A1* | 12/2015 | Beckhardt ............... H04H 60/80 726/4 |
| 2016/0301678 A1 | 10/2016 | Bakar et al. |
| 2018/0007060 A1 | 1/2018 | Leblang et al. |
| 2018/0225012 A1 | 8/2018 | Bates et al. |
| 2018/0338177 A1 | 11/2018 | Graham et al. |
| 2020/0387339 A1 | 12/2020 | House et al. |

FOREIGN PATENT DOCUMENTS

| | | |
|---|---|---|
| WO | 200147248 | 6/2001 |
| WO | 200153994 | 7/2001 |
| WO | 2003093950 A2 | 11/2003 |

OTHER PUBLICATIONS

Notice of Allowance dated Sep. 15, 2017, issued in connection with U.S. Appl. No. 14/606,162, filed Jan. 27, 2015, 10 pages.
Notice of Allowance dated Apr. 18, 2023, issued in connection with U.S. Appl. No. 18/098,681, filed Jan. 18, 2023, 7 pages.
Notice of Allowance dated Jul. 19, 2023, issued in connection with U.S. Appl. No. 18/048,033, filed Oct. 20, 2022, 10 pages.
Notice of Allowance dated Sep. 24, 2019, issued in connection with U.S. Appl. No. 16/142,895, filed Sep. 26, 2018, 5 pages.
Notice of Allowance dated Jun. 27, 2022, issued in connection with U.S. Appl. No. 17/521,148, filed Nov. 8, 2021, 10 pages.
Notice of Allowance dated Aug. 31, 2018, issued in connection with U.S. Appl. No. 15/876,928, filed Jan. 22, 2018, 7 pages.
Notice of Allowance dated Aug. 8, 2019, issued in connection with U.S. Appl. No. 14/330,754, filed Jul. 14, 2014, 9 pages.
Notice of Allowance dated Jun. 8, 2021, issued in connection with U.S. Appl. No. 16/773,280, filed Jan. 27, 2020, 7 pages.
Notice of Allowance dated Nov. 9, 2022, issued in connection with U.S. Appl. No. 17/581,187, filed Jan. 21, 2022, 7 pages.
Palm, Inc., "Handbook for the Palm VII Handheld," May 2000, 311 pages.
Pre-Brief Appeal Conference Decision dated Jul. 30, 2019, issued in connection with U.S. Appl. No. 14/330,754, filed Jul. 14, 2014, 2 pages.
Preinterview First Office Action dated Jul. 14, 2017, issued in connection with U.S. Appl. No. 14/606,162, filed Jan. 27, 2015, 5 pages.
Presentations at WinHEC 2000, May 2000, 138 pages.
Sonos Developer Portal—DeviceLink Authentication Mode, Oct. 14, 2014, 6 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
"Welcome. You're watching Apple TV." Apple TV 1st Generation Setup Guide, Apr. 8, 2008 http://manuals.info.apple.com/MANUALS/0/MA403/en_US/AppleTV_SetupGuide.pdf Retrieved Oct. 14, 2014, 40 pages.
"Welcome. You're watching Apple TV." Apple TV 2nd Generation Setup Guide, Mar. 10, 2011 Retrieved Oct. 16, 2014, 36 pages.
"Welcome. You're watching Apple TV." Apple TV 3rd Generation Setup Guide, Mar. 16, 2012 Retrieved Oct. 16, 2014, 36 pages.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
Advisory Action dated Apr. 22, 2021, issued in connection with U.S. Appl. No. 16/372,014, filed Apr. 1, 2019, 3 pages.
Advisory Action dated Apr. 30, 2018, issued in connection with U.S. Appl. No. 14/330,754, filed Jul. 14, 2014, 3 pages.
AudioTron Quick Start Guide, Version 1.0, Mar. 2001, 24 pages.
Audio Tron Reference Manual, Version 3.0, May 2002, 70 pages.
Audio Tron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European EPC Article 94.3 dated Oct. 13, 2022, issued in connection with European Application No. 20166880.3, 10 pages.
European Patent Office, European Extended Search Report dated Jun. 18, 2020, issued in connection with European Application No. 20166880.3, 9 pages.
European Patent Office, European Office Action dated Apr. 29, 2019, issued in connection with European Application No. 15823218.1, 7 pages.
European Patent Office, Search Report dated Jun. 30, 2017, issued in connection with European Patent Application No. 15822232.2, 8 pages.
Final Office Action dated Jan. 15, 2021, issued in connection with U.S. Appl. No. 16/372,014, filed Apr. 1, 2019, 15 pages.
Final Office Action dated Jan. 26, 2017, issued in connection with U.S. Appl. No. 14/330,754, filed Jul. 14, 2014, 18 pages.
Final Office Action dated Aug. 29, 2019, issued in connection with U.S. Appl. No. 16/142,895, filed Sep. 26, 2018, 9 pages.
Final Office Action dated Aug. 29, 2022, issued in connection with U.S. Appl. No. 17/581,187, filed Jan. 21, 2022, 12 pages.
Final Office Action dated Nov. 3, 2018, issued in connection with U.S. Appl. No. 14/330,754, filed Jul. 14, 2014, 18 pages.

(56) References Cited

OTHER PUBLICATIONS

Final Office Action dated Feb. 4, 2019, issued in connection with U.S. Appl. No. 14/330,754, filed Jul. 14, 2014, 18 pages.
Final Office Action dated Nov. 4, 2020, issued in connection with U.S. Appl. No. 16/700,676, filed Dec. 2, 2019, 28 pages.
Hardt. The OAuth 2.0 Authorization Framework. Internet Engineering Task Force, Microsoft, Oct. 2012, 77 pages.
International Bureau, International Preliminary Report on Patentability, dated Jul. 10, 2014, issued in connection with International Application No. PCT/US2012/071212, filed Dec. 21, 2012, 8 pages.
International Searching Authority, International Preliminary Report on Patentability dated Jan. 26, 2017, issued in connection with International Application No. PCT/US2015/040347, filed on Jul. 14, 2015, 8 pages.
International Searching Authority, International Search Report and Written Opinion dated Mar. 30, 2016, issued in connection with International Application No. PCT/US2015/061904, filed on Nov. 20, 2015, 12 pages.
International Searching Authority, International Search Report and Written Opinion dated Nov. 4, 2015, issued in connection with International Application No. PCT/US2015/040347, filed on Jul. 14, 2015, 11 pages.
International Searching Authority, International Search Report dated Sep. 30, 2013, issued in connection with International Patent Application No. PCT/US2013/046383, filed on Jun. 18, 2013, 3 pages.
International Searching Authority, Written Opinion dated Sep. 30, 2013, issued in connection with International Patent Application No. PCT/US2013/046383, filed on Jun. 18, 2013, 7 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Apr. 1, 2020, issued in connection with U.S. Appl. No. 16/700,676, filed Dec. 2, 2019, 25 pages.
Non-Final Office Action dated Jun. 10, 2021, issued in connection with U.S. Appl. No. 16/372,014, filed Apr. 1, 2019, 10 pages.
Non-Final Office Action dated Oct. 14, 2022, issued in connection with U.S. Appl. No. 17/486,329, filed Sep. 27, 2021, 14 pages.
Non-Final Office Action dated May 16, 2022, issued in connection with U.S. Appl. No. 17/581,187, filed Jan. 21, 2022, 15 pages.
Non-Final Office Action dated Jun. 18, 2018, issued in connection with U.S. Appl. No. 14/330,754, filed Jul. 14, 2014, 17 pages.
Non-Final Office Action dated Aug. 19, 2016, issued in connection with U.S. Appl. No. 14/330,754, filed Jul. 14, 2014, 19 pages.
Non-Final Office Action dated Feb. 19, 2021, issued in connection with U.S. Appl. No. 16/700,676, filed Dec. 2, 2019, 19 pages.
Non-Final Office Action dated Jun. 22, 2017, issued in connection with U.S. Appl. No. 14/330,754, filed Jul. 14, 2014, 15 pages.
Non-Final Office Action dated Mar. 24, 2021, issued in connection with U.S. Appl. No. 16/773,280, filed Jan. 27, 2020, 13 pages.
Non-Final Office Action dated Sep. 29, 2020, issued in connection with U.S. Appl. No. 16/372,014, filed Apr. 1, 2019, 11 pages.
Non-Final Office Action dated Apr. 3, 2018, issued in connection with U.S. Appl. No. 15/876,928, filed Aug. 22, 2018, 8 pages.
Non-Final Office Action dated Jun. 3, 2021, issued in connection with U.S. Appl. No. 17/146,141, filed Jan. 11, 2021, 15 pages.
Non-Final Office Action dated Apr. 30, 2019, issued in connection with U.S. Appl. No. 16/142,895, filed Sep. 26, 2018, 14 pages.
Non-Final Office Action dated Mar. 31, 2020, issued in connection with U.S. Appl. No. 16/372,014, filed Apr. 1, 2019, 10 pages.
Non-Final Office Action dated Apr. 5, 2023, issued in connection with U.S. Appl. No. 18/098,681, filed Jan. 18, 2023, 19 pages.
Notice of Allowance dated Aug. 2, 2021, issued in connection with U.S. Appl. No. 17/146,141, filed Jan. 11, 2021, 7 pages.
Notice of Allowance dated Aug. 3, 2021, issued in connection with U.S. Appl. No. 16/700,676, filed Dec. 2, 2019, 9 pages.
Notice of Allowance dated Sep. 7, 2021, issued in connection with U.S. Appl. No. 16/372,014, filed Apr. 1, 2019, 9 pages.
Notice of Allowance dated Feb. 9, 2023, issued in connection with U.S. Appl. No. 17/486,329, filed Sep. 27, 2021, 7 pages.

\* cited by examiner

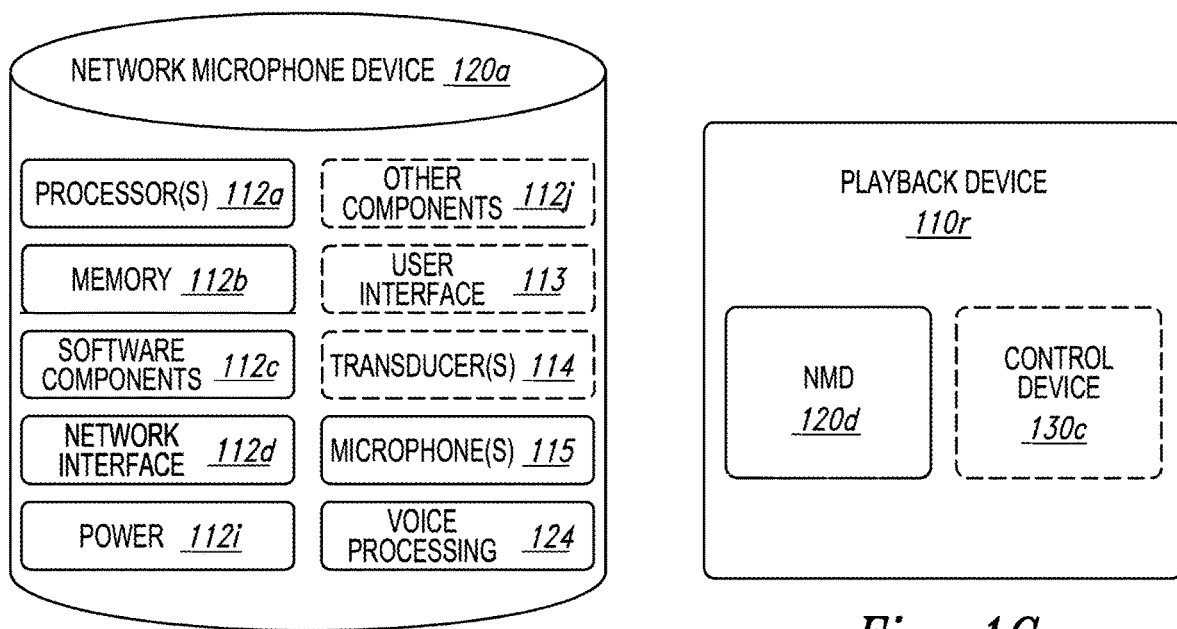
*Fig. 1F*
*Fig. 1G*
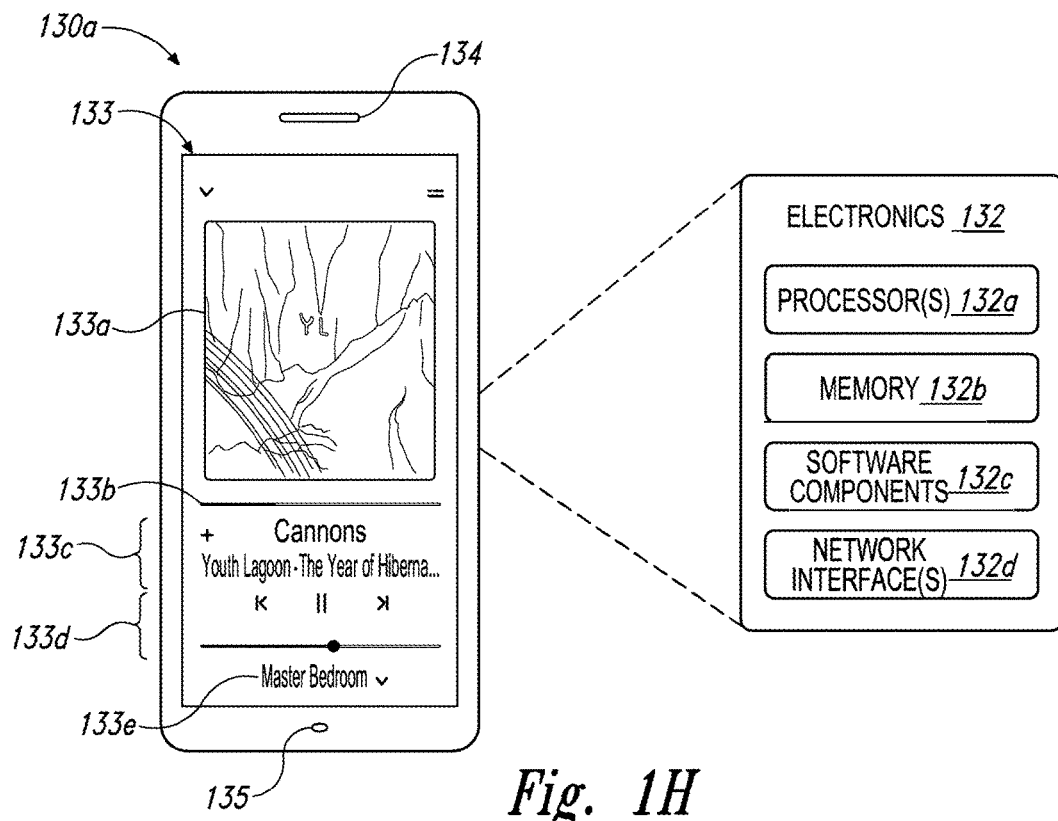
*Fig. 1H*

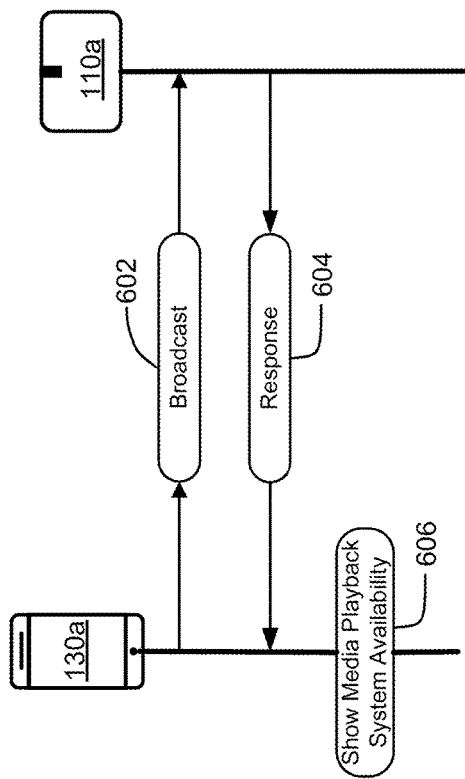
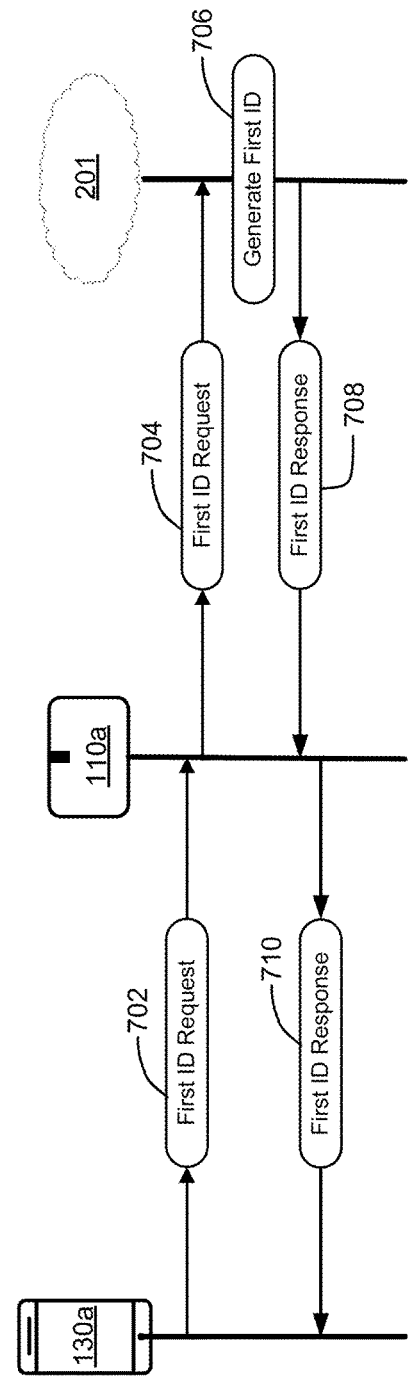
Fig. 6
Fig. 7

ACCESS CONTROL TECHNIQUES FOR MEDIA PLAYBACK SYSTEMS

CROSS-REFERENCE TO RELATED APPLICATIONS

This application claims priority under 35 U.S.C. § 120 to, and is a continuation of, U.S. patent application Ser. No. 17/527,887, filed on Nov. 16, 2021, entitled "Access Control Techniques for Media Playback Systems," the contents of which are incorporated by reference herein in its entirety.

U.S. patent application Ser. No. 17/527,887 claims priority under 35 U.S.C. § 120 to, and is a continuation of, U.S. patent application Ser. No. 16/372,014, filed on Apr. 1, 2019, entitled "Access Control Techniques for Media Playback Systems," and issued as U.S. Pat. No. 11,184,666 on Nov. 23, 2016, the contents of which are incorporated by reference herein in its entirety.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, titled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1F is a block diagram of a network microphone device.

FIG. 1G is a block diagram of a playback device.

FIG. 1H is a partial schematic diagram of a control device.

FIG. 6 is a message flow diagram depicting example messages to detect a media playback system.

FIG. 7 is a message flow diagram depicting example messages to obtain a first identifier.

Figure 1A:
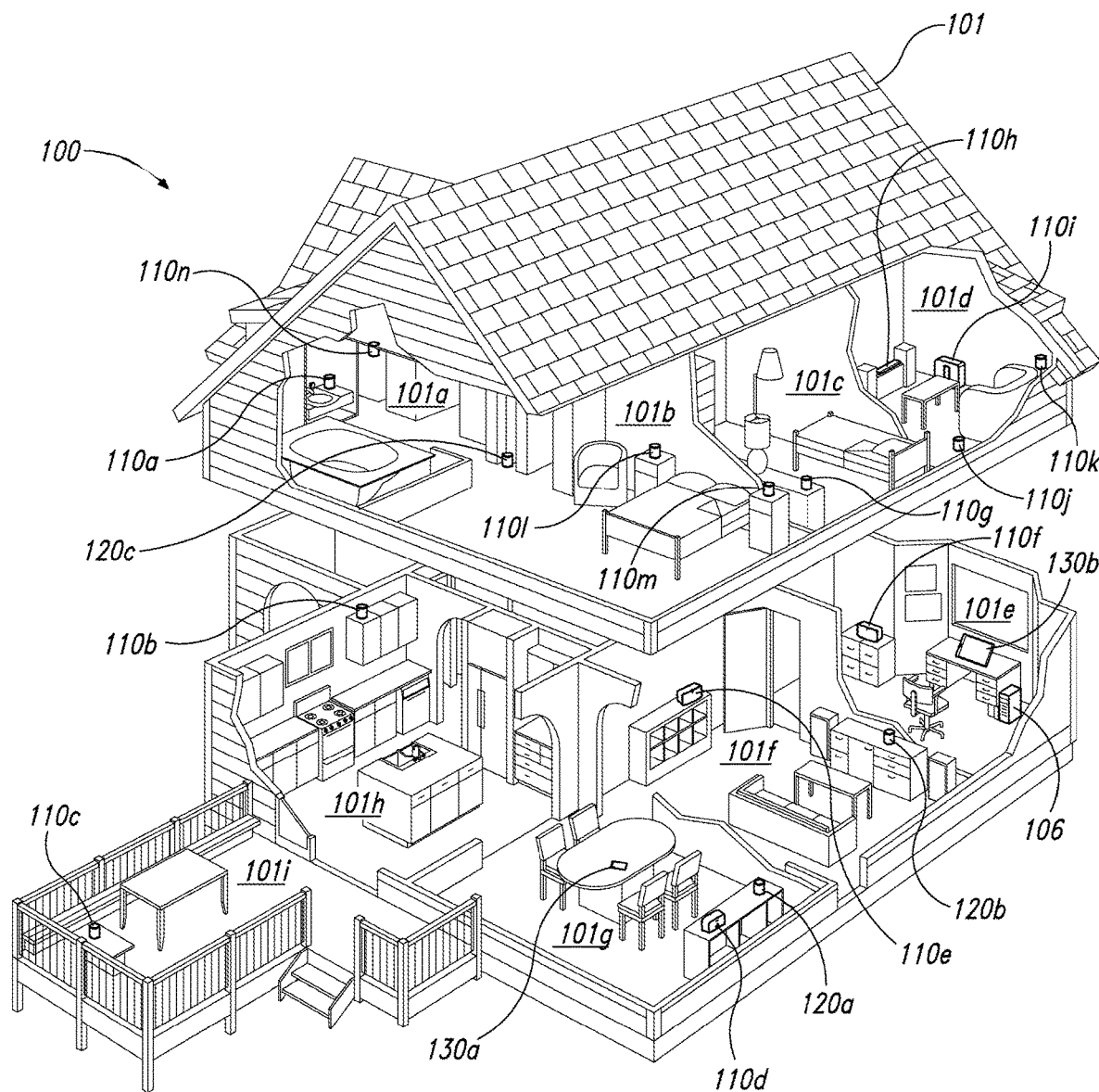
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Playing media content, such as music, radio, audio books, and videos, can be a social activity that involves multiple individuals. For example, a household may play music via a media playback system during a social gathering such as a birthday party. In another example, a business may play music via a media playback system for patrons of the business. In such environments, individuals other than the owner of the media playback system may wish for certain media to be played on the media playback system. For example, a guest may visit a household and want to play a new song for the household on a media playback system that they recently heard on a music streaming service (e.g., SPOTFY, PANDORA, AMAZON MUSIC). Conventionally, only the owner of the media playback system is permitted to control playback of media on the media playback system. As a result, a guest would need to ask the owner of the media playback system to play the particular song.

Such conventional architectures where only the owner of the media playback system is permitted to control the media playback system may have several limitations. For example, a guest may ask the owner of the media playback system to play a piece of media that is unavailable to the owner of the media playback system (e.g., the owner neither owns the song nor has access to the song via any streaming service to which the owner subscribes). As a result, the owner of the media playback system may be unable to comply with the request and the guest may have to play the media on their own computing device (e.g., their smartphone).

One approach to empower guests of an establishment with a media playback system is to enable guest access for the media playback system. In such an approach, an owner may permit guests to directly control a subset of operations of the media playback system, such as adding media to a queue and changing playback volume. As a result, a guest may be able to play media from their own computing device instead of having to ask the owner of the media playback system to play particular media. Examples of such guest access for media playback systems are described in U.S. Patent Publication No. 2018/0225012 titled "Guest Access to a Media Playback System," filed on Apr. 5, 2018 and U.S. Pat. No. 9,374,607 titled "Media Playback System with Guest Access," filed on Jun. 26, 2012, each of which is incorporated herein by reference in its entirety.

Enabling access to additional users separate and apart from the owner of the media playback system, such as guests, may raise security challenges. For example, blindly allowing any individual with a computing device to make changes to the operation of the media playback system may disadvantageously permit wrongdoers to tamper with the media playback system. While an unsophisticated wrongdoer may simply annoy other users of the media playback system by inappropriately modifying a playback queue and/or maximizing playback volume, a more sophisticated wrongdoer may cause significant damage. For example, a wrongdoer may install different firmware on the media playback system that includes known security vulnerabilities. The wrongdoer may, in turn, exploit such vulnerabilities to permanently damage one or more components of the media playback system and/or gain access to a network (e.g., a Wi-Fi network) to steal sensitive information from other devices on the network.

Accordingly, aspects of the present disclosure relate to new access control techniques to, for example, facilitate the introduction of other types of users separate and apart from the owner of the media playback system (e.g., guest users) without compromising the security of the media playback system. It should be appreciated that such access control techniques may also be readily implemented in media playback systems with only a single user (and/or a single type of user) to further enhance security of the media playback system. As a result, the access control techniques described herein may be advantageously implemented in media playback systems that support any number of users and/or user types.

The access control techniques described herein may employ a plurality of credentials (e.g., unique identifiers) that a computing device obtains from different sources in order to gain access to the media playback system. For example, a computing device seeking access to the media playback system may obtain each of the following credentials: (1) a first identifier that is associated with the media playback system (e.g., obtained from the media playback system itself over a network, such as a Wi-Fi network, that the media playback system is connected and/or an owner of the media playback system); (2) a second identifier obtained from a computing system (e.g., a cloud platform where the media playback system is registered) using the first identifier; and (3) a token that is obtained from the computing system using the second identifier (and/or the first identifier) . By employing multiple credentials that are obtained from different sources in such a manner, a malicious user would need to compromise multiple distinct systems in order to gain the requisite credentials to access to the media playback system. For example, malicious users that are geographically remote from the media playback system are unlikely to be able to successfully obtain the first identifier because such malicious users are not on the same network (e.g., the same Wi-Fi network) as the media playback system or in communication with the owner of the media playback system. Even malicious users that have successfully obtained the first identifier may still be unable to obtain the second identifier because of one or more access restrictions stored by the computing system that limit access to the media playback system (e.g., require explicit approval by the owner before a new user is permitted, limit the number of concurrent users, forbid certain types of users). For illustration, the computing system may require explicit approval from the owner (e.g., in the form of a response to a notification, an email, or a text message) before generating a second identifier for a new computing device. As a result, malicious users are prevented from inappropriately gaining access to the media playback system while still permitting additional users and/or user types.

The access control techniques described herein may be readily applied to media playback systems (or other types of systems) that employ any of a variety of user permissions schemes. Such user permissions schemes may limit access to a single type of user (e.g., an owner user) or provide access to a plurality of different types of users (e.g., an owner user, a guest user, a child user). The media playback systems may be controlled, at least in part, by a computing device that has been successfully authenticated. Examples of such computing devices include smartphones, tablets, wearable computers (e.g., smartwatches and smartglasses), desktop computers, and laptop computers. The computing device may comprise one or more network interfaces that enable communication over one or more networks (e.g., wide area networks (WANs), local area networks (LANs), personal area networks (PANs)). The computing device may further comprise one or more processors and data storage having stored therein instructions executable by the one or more processors to cause the computing device to perform various operations. The data storage may comprise, for example, a non-transitory computer readable medium such as non-volatile memory (e.g., hard disk drives, solid state drives) or volatile memory (e.g., random-access memory (RAM)). The instructions may be organized into, for example, one or more applications including a native application made by the manufacturer of the media playback system and/or a third-party application made by a company other than the manufacturer of the media playback system (e.g., an application made by a music streaming company, such as SPOTIFY or PANDORA, selling a music streaming service that is playable on the media playback system).

In some embodiments, the instructions stored in the data storage may cause the computing device to obtain access to and/or control the media playback system. In these embodiments, the computing device may receive a request to control a media playback system comprising a playback device connected to a network. The computing device may receive the request from, for example, a user via a graphical user interface (GUI) displayed on the computing device. For illustration, the computing device may detect activation of a cast icon in the GUI for transferring playback from the computing device to the media playback system. After the computing device receives the request to control the media playback system, the computing device may obtain access to the media playback system by, for example, obtaining at least one credential from each of at least two different sources.

The computing device may obtain, as a first credential, a first identifier (e.g., a guest code). The first identifier may be, for example, a sequence of characters (e.g., numbers, letters, and/or symbols) that may be associated with the media playback system. The computing device may obtain the first identifier in any of a variety of ways. For example, the computing device may be on the same network (e.g., the same LAN and/or PAN) as the media playback system. In this example, the computing device may obtain the first identifier from the media playback system at least in part by transmitting a request for the first identifier to the media playback system over the network and receiving a response from the media playback system that comprises the first identifier. In another example, the computing device may obtain the first identifier from the user via one or more input fields the GUI displays on the computing device. In this example, the user may obtain the first identifier (e.g., from an owner of the media playback system or from a display on the media playback system) and type the first identifier into the one or more inputs fields in the GUI.

After the computing device has obtained the first identifier, the computing device may obtain, as a second credential, a second identifier (e.g., an authorization code) using the first identifier. The second identifier may be, for example, a sequence of characters (e.g., numbers, letters, and/or symbols) that may be associated with the computing device (and/or the user operating the computing device). The computing device may obtain the second identifier from a computing system comprising one or more computing devices. The computing system be, for example, one or more cloud platforms comprising one or more cloud servers. The computing device may communicate with the computing system over a WAN (e.g., the Internet) in implementations where the computing system is remote (e.g., the computing system comprises one or more cloud servers) relative to the computing device. In implementations where the computing system is not remote from the computing device (e.g., the computing system comprises one or more servers on the same LAN as the computing device), the computing device may communicate with the computing system over the LAN.

The computing device may obtain the second identifier from the computing system in any of a variety of ways. For example, the computing device may transmit a request for the second identifier to the computing system that comprises (or otherwise accompanied by) the first identifier. The computing device may receive, in response to the computing system determining the first identifier is authentic, the second identifier from the computing system. In some instances, the second request may comprise additional credentials separate and apart from the first identifier. For example, the user seeking access for their computing device to the media playback system may have an account registered with the computing system. In this example, the second request may additionally comprise user login credentials (e.g., a username, a password, and/or a biometric) associated with the users account. Additionally (or alternatively), the computing device may further transmit a value that is unique to the computing device, such as a client identifier.

After the computing device has obtained the second identifier, the computing device may obtain, as a third credential, a token (e.g., an access token) using the second identifier and/or the first identifier. The token may be employed by the computing device to cause the media playback system to perform various operations, such as playing media, pausing media, increasing volume, decreasing volume, adding media to a playlist, removing media from a playlist, reordering media in a playlist, and skipping media in a playlist. The computing device may obtain the token from the computing system (e.g., by communicating over a WAN and/or a LAN). For example, the computing device may transmit a request for the token to the computing system that comprises (or otherwise accompanied by) the second identifier and/or the first identifier. The computing device may receive, in response to the computing system determining that the second identifier and/or the first identifier are valid, the token.

After the computing device has obtained the token, the computing device may receive a request for the media playback system to perform an operation. The computing device may receive the request from, for example, a user via a GUI displayed on the computing device. For example, the computing device may detect selection of forward skip icon in the GUI for triggering the media playback system to forward skip media in a playlist. The computing device may, in turn, cause the media playback system to perform the requested operation using the token. For example, the computing device may transmit (e.g., over a LAN and/or a PAN) to the media playback system a request for the media playback system to perform the operation and the token. In turn, the media playback system may perform the operation in response to, for example, the token being valid.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110a is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110a-n), one or more network microphone devices 120 ("NMDs") (identified individually as NMDs 120a-c), and one or more control devices 130 (identified individually as control devices 130a and 130b).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term "NMD" (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100. A control device may be implemented as, for example, a computing device having one or more applications installed thereon that enable control of the media playback system (e.g., the ability to cause the media control system to perform one or more operations). Such applications may include a native application made by the manufacturer of the media playback system and/or a third-party application made by a company other than the manufacturer of the media playback system.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 100*a*) in synchrony with a second playback device (e.g., the playback device 100*b*). Interactions between the playback devices 110, NMDs 120, and/or control devices 130 of the media playback system 100 configured in accordance with the various embodiments of the disclosure are described in greater detail below with respect to FIGS. 1B-1H.

In the illustrated embodiment of FIG. 1A, the environment 101 comprises a household having several rooms, spaces, and/or playback zones, including (clockwise from upper left) a master bathroom 101*a*, a master bedroom 101*b*, a second bedroom 101*c*, a family room or den 101*d*, an office 101*e*, a living room 101*f*, a dining room 101*g*, a kitchen 101*h*, and an outdoor patio 101*i*. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed, to form, for example, the configuration shown in FIG. 1A. Each zone may be given a name according to a different room or space such as the office 101*e*, master bathroom 101*a*, master bedroom 101*b*, the second bedroom 101*c*, kitchen 101*h*, dining room 101*g*, living room 101*f*, and/or the balcony 101*i*. In some aspects, a single playback zone may include multiple rooms or spaces. In certain aspects, a single room or space may include multiple playback zones.

In the illustrated embodiment of FIG. 1A, the master bathroom 101*a*, the second bedroom 101*c*, the office 101*e*, the living room 101*f*, the dining room 101*g*, the kitchen 101*h*, and the outdoor patio 101*i* each include one playback device 110, and the master bedroom 101*b* and the den 101*d* include a plurality of playback devices 110. In the master bedroom 101*b*, the playback devices 110*l* and 110*m* may be configured, for example, to play back audio content in synchrony as individual ones of playback devices 110, as a bonded playback zone, as a consolidated playback device, and/or any combination thereof. Similarly, in the den 101*d*, the playback devices 110*h-j* can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1E.

In some aspects, one or more of the playback zones in the environment 101 may each be playing different audio content. For instance, a user may be grilling on the patio 101*i* and listening to hip hop music being played by the playback device 110*c* while another user is preparing food in the kitchen 101*h* and listening to classical music played by the playback device 110*b*. In another example, a playback zone may play the same audio content in synchrony with another playback zone. For instance, the user may be in the office 101*e* listening to the playback device 110*f* playing back the same hip hop music being played back by playback device 110*c* on the patio 101*i*. In some aspects, the playback devices 110*c* and 110*f* play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 (hereinafter "'395 Patent") filed Apr. 1, 2004 and titled, "System and method for synchronizing operations among a plurality of independently clocked digital data processing devices," which is incorporated herein by reference in its entirety.

a. Suitable Media Playback System

Figure 1B:
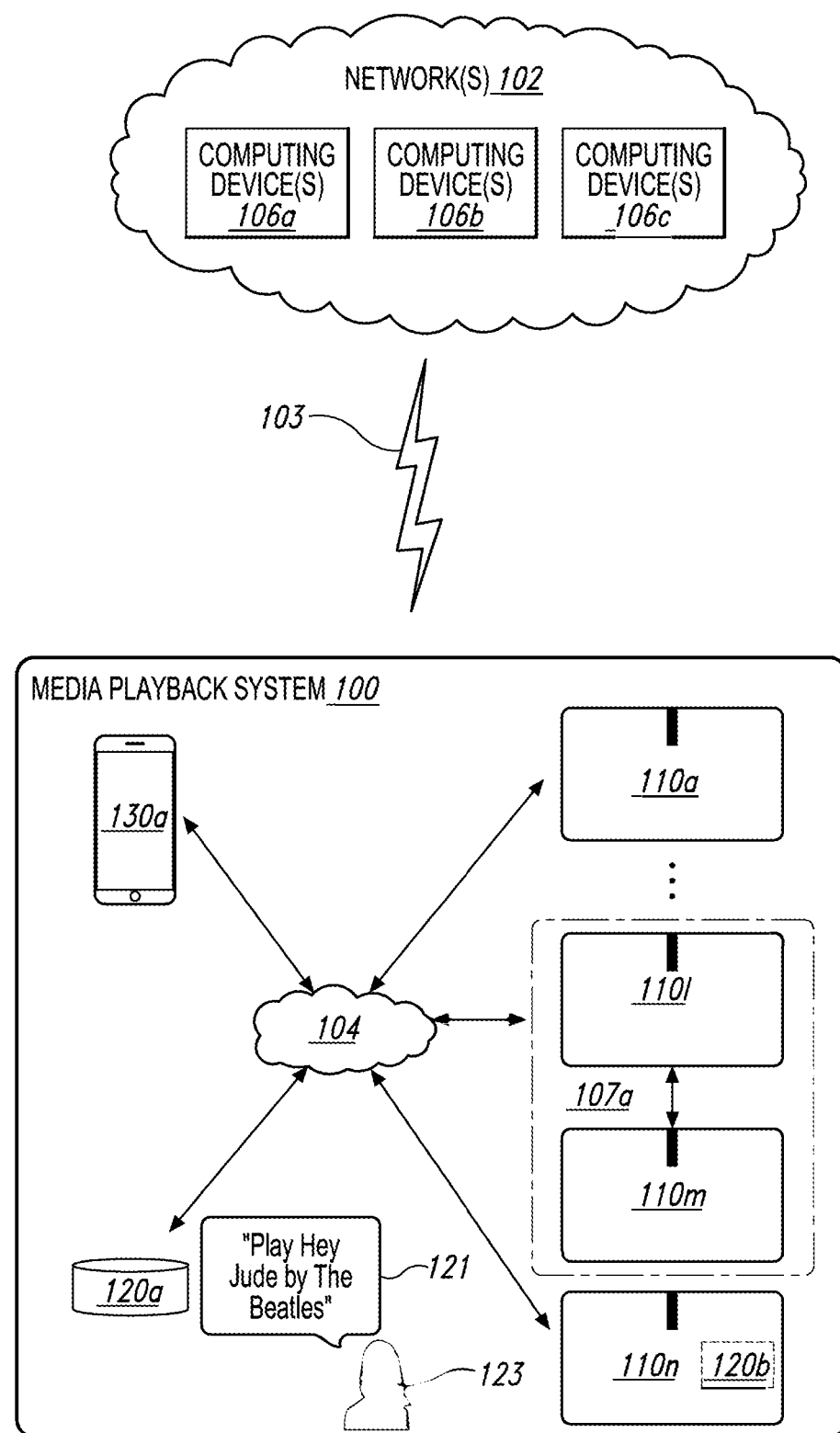
FIG. 1B is a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN) (e.g., the Internet), one or more local area networks (LAN) (e.g., one or more WiFi networks), one or more personal area networks (PAN) (e.g., one or more BLUETOOTH networks, Z-WAVE networks, wireless Universal Serial Bus (USB) networks, ZIGBEE networks, and/or IRDA networks), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g., voice input data) from the media playback system 100 and correspondingly transmit commands and/or media content to the media playback system 100.

The cloud network 102 comprises computing devices 106 (identified separately as a first computing device 106*a*, a second computing device 106*b*, and a third computing device 106*c*). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a BLUETOOTH network, a Z-WAVE network, a ZIGBEE network, and/or other suitable wireless communication protocol network) and/or a wired network (e.g., a network comprising Ethernet, USB, and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct or indirect connections, PANs, LANs, telecommunication networks, and/or other suitable communication links. The network 104 may be referred to herein as a "local communication network" to differentiate the network 104 from the cloud network 102 that couples the media playback system 100 to remote devices, such as cloud services.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain embodiments, for example, the group 107*a* comprises a bonded zone in which the playback devices 110*l* and 110*m* comprise left audio and right audio channels, respectively, of multi-channel audio content, thereby producing or enhancing a stereo effect of the audio content. In some embodiments, the group 107*a* includes additional playback devices 110. In other embodiments, however, the media playback system 100 omits the group 107*a* and/or other grouped arrangements of the playback devices 110.

The media playback system 100 includes the NMDs 120*a* and 120*d*, each comprising one or more microphones configured to receive voice utterances from a user. In the illustrated embodiment of FIG. 1B, the NMD 120*a* is a standalone device and the NMD 120*d* is integrated into the playback device 110*n*. The NMD 120*a*, for example, is configured to receive voice input 121 from a user 123. In some embodiments, the NMD 120*a* transmits data associated with the received voice input 121 to a voice assistant service (VAS) configured to (i) process the received voice input data and (ii) facilitate one or more operations on behalf of the media playback system 100.

In some aspects, for example, the computing device 106c comprises one or more modules and/or servers of a VAS (e.g., a VAS operated by one or more of SONOS, AMAZON, GOOGLE, APPLE, MICROSOFT, NUANCE). The computing device 106c can receive the voice input data from the NMD 120a via the network 104 and the links 103.

In response to receiving the voice input data, the computing device 106c processes the voice input data (i.e., "Play Hey Jude by The Beatles"), and determines that the processed voice input includes a command to play a song (e.g., "Hey Jude"). In some embodiments, after processing the voice input, the computing device 106c accordingly transmits commands to the media playback system 100 to play back "Hey Jude" by the Beatles from a suitable media service (e.g., via one or more of the computing devices 106) on one or more of the playback devices 110. In other embodiments, the computing device 106c may be configured to interface with media services on behalf of the media playback system 100. In such embodiments, after processing the voice input, instead of the computing device 106c transmitting commands to the media playback system 100 causing the media playback system 100 to retrieve the requested media from a suitable media service, the computing device 106c itself causes a suitable media service to provide the requested media to the media playback system 100 in accordance with the user's voice utterance.

b. Suitable Playback Devices

Figure 1C:
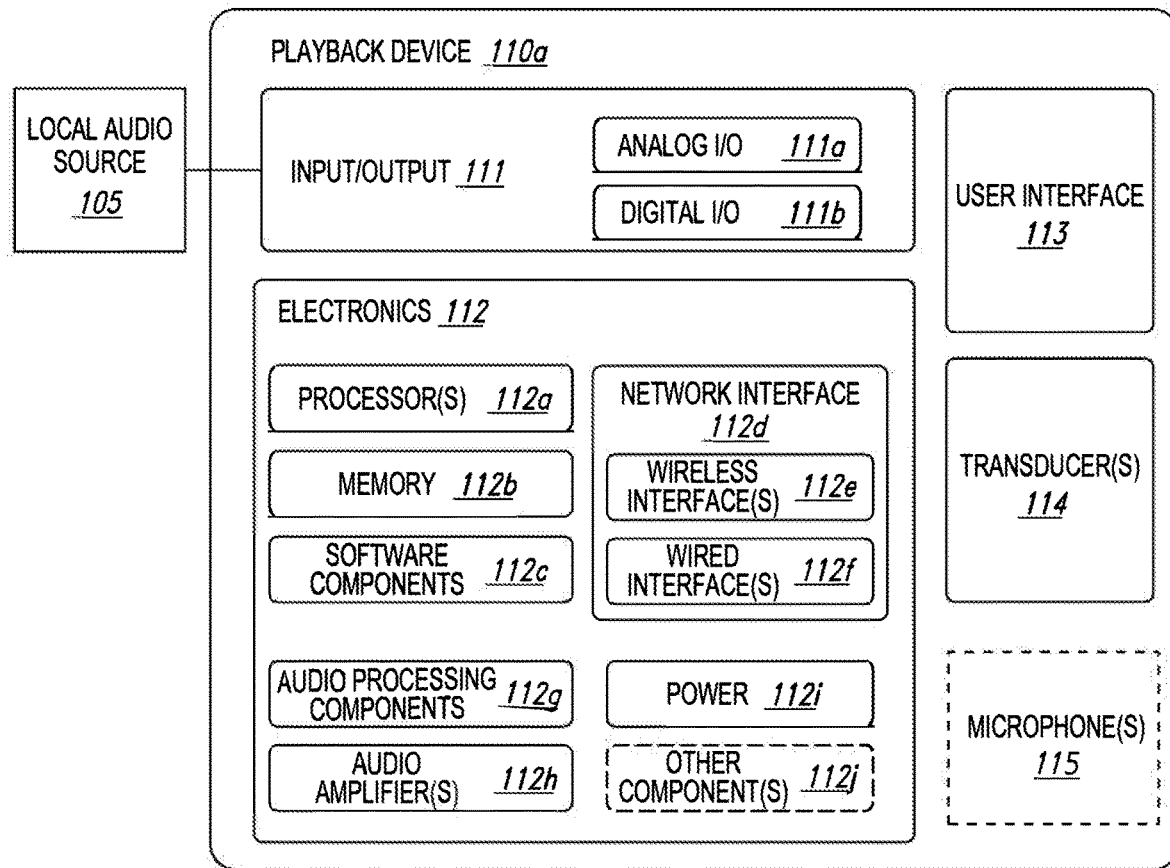
FIG. 1C is a block diagram of a playback device.

FIG. 1C is a block diagram of the playback device 110a comprising an input/output 111. The input/output 111 can include an analog I/O 111a (e.g., one or more wires, cables, and/or other suitable communication links configured to carry analog signals) and/or a digital I/O 111b (e.g., one or more wires, cables, or other suitable communication links configured to carry digital signals). In some embodiments, the analog I/O 111a is an audio line-in input connection comprising, for example, an auto-detecting 3.5 mm audio line-in connection. In some embodiments, the digital I/O 111b comprises a Sony/Philips Digital Interface Format (S/PDIF) communication interface and/or cable and/or a Toshiba Link (TOSLINK) cable. In some embodiments, the digital I/O 111b comprises an High-Definition Multimedia Interface (HDMI) interface and/or cable. In some embodiments, the digital I/O 111b includes one or more wireless communication links comprising, for example, a radio frequency (RF), infrared, WiFi, BLUETOOTH, or another suitable communication protocol. In certain embodiments, the analog I/O 111a and the digital 111b comprise interfaces (e.g., ports, plugs, jacks) configured to receive connectors of cables transmitting analog and digital signals, respectively, without necessarily including cables.

The playback device 110a, for example, can receive media content (e.g., audio content comprising music and/or other sounds) from a local audio source 105 via the input/output 111 (e.g., a cable, a wire, a wired and/or wireless communication network such as a PAN and/or a LAN, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110a does not include an input/output 111 and receives all audio content via the network 104.

The playback device 110a further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 are configured to receive audio from an audio source (e.g., the local audio source 105) via the input/output 111 or one or more of the computing devices 106a-c via the network 104 (FIG. 1B), amplify the received audio, and output the amplified audio for playback via one or more of the transducers 114. In some embodiments, the playback device 110a optionally includes one or more microphones 115 (e.g., a single microphone, a plurality of microphones, a microphone array) (hereinafter referred to as "the microphones 115"). In certain embodiments, for example, the playback device 110a having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112a (referred to hereinafter as "the processors 112a"), memory 112b, software components 112c, a network interface 112d, one or more audio processing components 112g (referred to hereinafter as "the audio components 112g"), one or more audio amplifiers 112h (referred to hereinafter as "the amplifiers 112h"), and power 112i (e.g., one or more power supplies, power cables, power receptacles, batteries, induction coils, Power-over Ethernet (POE) interfaces, and/or other suitable sources of electric power). In some embodiments, the electronics 112 optionally include one or more other components 112j (e.g., one or more sensors, video displays, touchscreens, battery charging bases).

The processors 112a can comprise clock-driven computing component(s) configured to process data, and the memory 112b can comprise a computer-readable medium (e.g., a tangible, non-transitory computer-readable medium loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio data from an audio source (e.g., one or more of the computing devices 106a-c (FIG. 1B)), and/or another one of the playback devices 110. In some embodiments, the operations further include causing the playback device 110a to send audio data to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in the '395 Patent incorporated by reference above.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112d is configured to facilitate a transmission of data between the playback device 110a and one or more other devices on a data network such as, for example, the links 103 and/or the network 104 (FIG. 1B). The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, BLUETOOTH, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 excludes the network interface 112d altogether and transmits and receives media content and/or other data via another communication path (e.g., the input/output 111).

The audio components 112g are configured to process and/or filter data comprising media content received by the electronics 112 (e.g., via the input/output 111 and/or the network interface 112d) to produce output audio signals. In some embodiments, the audio processing components 112g comprise, for example, one or more digital-to-analog converters (DAC), audio preprocessing components, audio enhancement components, digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omits the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some embodiments, for example, the amplifiers 112h include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112h comprise a suitable combination of two or more of the foregoing types of power amplifiers. Moreover, in some embodiments, individual ones of the amplifiers 112h correspond to individual ones of the transducers 114. In other embodiments, however, the electronics 112 includes a single one of the amplifiers 112h configured to output amplified audio signals to a plurality of the transducers 114. In some other embodiments, the electronics 112 omits the amplifiers 112h.

The transducers 114 (e.g., one or more speakers and/or speaker drivers) receive the amplified audio signals from the amplifier 112h and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

By way of illustration, SONOS, Inc. presently offers (or has offered) for sale certain playback devices including, for example, a "SONOS ONE," "PLAY:1," "PLAY:3," "PLAY:5," "PLAYBAR," "PLAYBASE," "BEAM," "CONNECT:AMP," "CONNECT," "AMP," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings.

For example, one or more playback devices 110 comprises wired and/or wireless headphones (e.g., over-the-ear headphones, on-ear headphones, in-ear earphones). In some embodiments, the headphone may comprise a headband coupled to one or more earcups. For example, a first earcup may be coupled to a first end of the headband and a second earcup may be coupled to a second end of the headband that is opposite the first end. Each of the one or more earcups may house any portion of the electronic components in the playback device, such as one or more transducers. Further, the one or more of earcups may include a user interface for controlling operation of the headphone such as for controlling audio playback, volume level, and other functions. The user interface may include any of a variety of control elements such as buttons, knobs, dials, touch-sensitive surfaces, and/or touchscreens. An ear cushion may be coupled each of the one or more earcups. The ear cushions may provide a soft barrier between the head of a user and the one or more earcups to improve user comfort and/or provide acoustic isolation from the ambient (e.g., provide passive noise reduction (PNR)). Additionally (or alternatively), the headphone may employ active noise reduction (ANR) techniques to further reduce the user's perception of outside noise during playback.

Figure 1D:
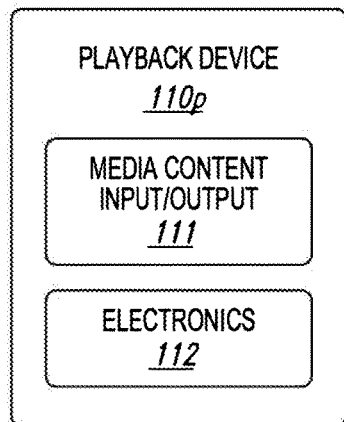
FIG. 1D is a block diagram of a playback device.

In some embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110p comprising the input/output 111 and electronics 112 without the user interface 113 or transducers 114.

Figure 1E:
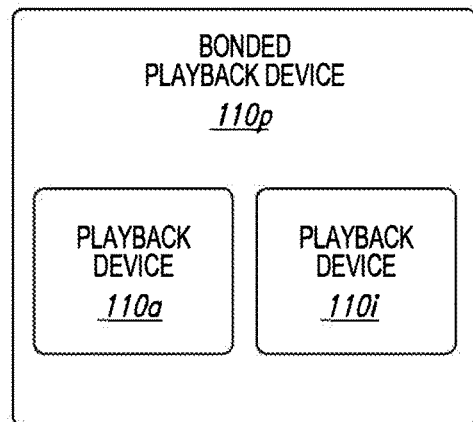
FIG. 1E is a block diagram of a bonded playback device.

FIG. 1E is a block diagram of a bonded playback device 110q comprising the playback device 110a (FIG. 1C) sonically bonded with the playback device 110i (e.g., a subwoofer) (FIG. 1A). In the illustrated embodiment, the playback devices 110a and 110i are separate ones of the playback devices 110 housed in separate enclosures. In some embodiments, however, the bonded playback device 110q comprises a single enclosure housing both the playback devices 110a and 110i. The bonded playback device 110q can be configured to process and reproduce sound differently than an unbonded playback device (e.g., the playback device 110a of FIG. 1C) and/or paired or bonded playback devices (e.g., the playback devices 110l and 110m of FIG. 1B). In some embodiments, for example, the playback device 110a is full-range playback device configured to render low frequency, mid-range frequency, and high frequency audio content, and the playback device 110i is a subwoofer configured to render low frequency audio content. In some aspects, the playback device 110a, when bonded with the first playback device, is configured to render only the mid-range and high frequency components of a particular audio content, while the playback device 110i renders the low frequency component of the particular audio content. In some embodiments, the bonded playback device 110q includes additional playback devices and/or another bonded playback device.

c. Suitable Network Microphone Devices (NMDs)

FIG. 1F is a block diagram of the NMD 120a (FIGS. 1A and 1B). The NMD 120a includes one or more voice processing components 124 (hereinafter "the voice components 124") and several components described with respect to the playback device 110a (FIG. 1C) including the processors 112a, the memory 112b, and the microphones 115. The NMD 120a optionally comprises other components also included in the playback device 110a (FIG. 1C), such as the user interface 113 and/or the transducers 114. In some embodiments, the NMD 120a is configured as a media playback device (e.g., one or more of the playback devices 110), and further includes, for example, one or more of the audio components 112g (FIG. 1C), the amplifiers 114, and/or other playback device components. In certain embodiments, the NMD 120a comprises an Internet of Things (IoT) device such as, for example, a thermostat, alarm panel, fire and/or smoke detector, etc. In some embodiments, the NMD 120a comprises the microphones 115, the voice processing 124, and only a portion of the components of the electronics 112 described above with respect to FIG. 1B. In some aspects, for example, the NMD 120a includes the processor 112a and the memory 112b (FIG. 1B), while omitting one or more other components of the electronics 112. In some embodiments, the NMD 120a includes additional components (e.g., one or more sensors, cameras, thermometers, barometers, hygrometers).

In some embodiments, an NMD can be integrated into a playback device. FIG. 1G is a block diagram of a playback device 110r comprising an NMD 120d. The playback device 110r can comprise many or all of the components of the playback device 110a and further include the microphones 115 and voice processing 124 (FIG. 1F). The playback device 110r optionally includes an integrated control device 130c. The control device 130c can comprise, for example, a user interface (e.g., the user interface 113 of FIG. 1B) configured to receive user input (e.g., touch input, voice input) without a separate control device. In other embodiments, however, the playback device 110r receives commands from another control device (e.g., the control device 130a of FIG. 1B).

Referring again to FIG. 1F, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue signifying a user voice input. For instance, in querying the AMAZON VAS, a user might speak the activation word "Alexa." Other examples include "Ok, Google" for invoking the GOOGLE VAS and "Hey, Siri" for invoking the APPLE VAS.

After detecting the activation word, voice processing 124 monitors the microphone data for an accompanying user request in the voice input. The user request may include, for example, a command to control a third-party device, such as a thermostat (e.g., NEST thermostat), an illumination device (e.g., a PHILIPS HUE lighting device), or a media playback device (e.g., a SONOS playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Control Devices

FIG. 1H is a partial schematic diagram of the control device 130a (FIGS. 1A and 1B). As used herein, the term "control device" can be used interchangeably with "controller" or "control system." Among other features, the control device 130a is configured to receive user input related to the media playback system 100 and, in response, cause one or more devices in the media playback system 100 to perform an action(s) or operation(s) corresponding to the user input. In the illustrated embodiment, the control device 130a comprises a smartphone (e.g., an IPHONE, an ANDROID phone) on which media playback system controller application software is installed. In some embodiments, the control device 130a comprises, for example, a tablet (e.g., an IPAD), a computer (e.g., a laptop computer, a desktop computer), and/or another suitable device (e.g., a television, an automobile audio head unit, an IoT device). In certain embodiments, the control device 130a comprises a dedicated controller for the media playback system 100. In other embodiments, as described above with respect to FIG. 1G, the control device 130a is integrated into another device in the media playback system 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processors 132a"), a memory 132b, software components 132c, and a network interface 132d. The processor 132a can be configured to perform functions relevant to facilitating user access, control, and configuration of the media playback system 100. The memory 132b can comprise data storage that can be loaded with one or more of the software components executable by the processor 302 to perform those functions. The software components 132c can comprise applications and/or other executable software configured to facilitate control of the media playback system 100. The memory 112b can be configured to store, for example, the software components 132c, media playback system controller application software, and/or other data associated with the media playback system 100 and the user.

The network interface 132d is configured to facilitate network communications between the control device 130a and one or more other devices in the media playback system 100, and/or one or more remote devices. In some embodiments, the network interface 132d is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 304 to one or more of the playback devices 100. The network interface 132d can also transmit and/or receive configuration changes such as, for example, adding/removing one or more playback devices 100 to/from a zone, adding/removing one or more zones to/from a zone group, forming a bonded or consolidated player, separating one or more playback devices from a bonded or consolidated player, among others.

The user interface 133 is configured to receive user input and can facilitate control of the media playback system 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated embodiment, the user interface 133 comprises a display presented on a touch screen interface of a smartphone (e.g., an IPHONE, an ANDROID phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130a. In some embodiments, the one or more speakers comprise individual transducers configured to correspondingly output low frequencies, mid-range frequencies, and/or high frequencies. In some aspects, for example, the control device 130a is configured as a playback device (e.g., one of the playback devices 110). Similarly, in some embodiments the control device 130a is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130a is configured to operate as a playback device and an NMD. In other embodiments, however, the control device 130a omits the one or more speakers 134 and/or the one or more microphones 135. For instance, the control device 130a may comprise a device (e.g., a thermostat, an IoT device, a network device) comprising a portion of the electronics 132 and the user interface 133 (e.g., a touch screen) without any speakers or microphones.

III. Example Access Control Techniques for Media Playback Systems

As discussed above, a computing device (e.g., a control device) may obtain multiple distinct identifiers from different sources in order to obtain access to a media playback system. For example, the computing device may need to obtain a first identifier from the owner of the media playback system and/or the media playback system itself and obtain a second identifier from a computer system (e.g., a cloud platform of one or more cloud servers) where the media playback system has been registered. An example implementation of these access control techniques is shown in FIG. 2 by the control device 130a obtaining access to a media playback system comprising playback device 110a by communicating with a computing system 201 comprising computing devices 106(a), 106(b), and/or 106(c) and the playback device 110a.

Figure 2:
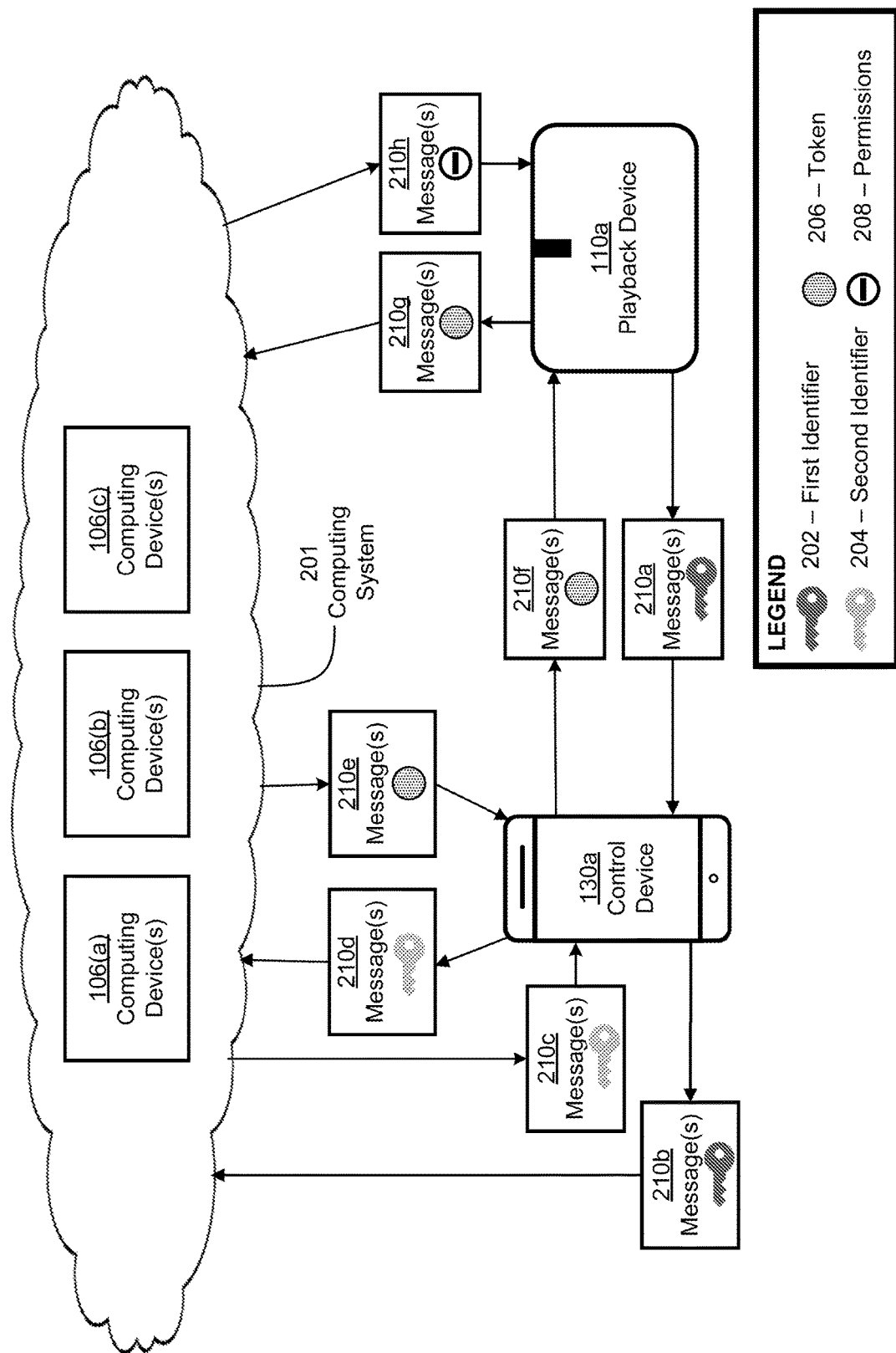
FIG. 2 is a diagram of a control device obtaining access to (and controlling) a media playback system.

The control device 130a shown in FIG. 2 may be associated with a user (e.g., an owner user or a guest user) that would like to control the media playback system that comprises the playback device 110a. The control device 130a may receive a request from the user to obtain access to the media playback system via, for example, a GUI displayed on the control device 130a. The GUI may be displayed in response to the control device 130a executing one or more applications, such as one or more native applications designed by the manufacturer of the media playback system and/or one or more third-party applications designed by another party. For example, the control device 130a may detect selection of an element in the GUI (e.g., a connect icon in a third-party application such as the SPOTIFY application), for controlling media playback on the media playback system. In another example, the control device 130a may detect activation of a native application for controlling the media playback system (e.g., opening the SONOS application).

After the control device 130a has received the request to obtain access to the media playback system, the control device 130a may begin the process of acquiring the appropriate credentials required to obtain access to the media playback system. The set of credentials required to obtain access to the media playback system may comprise a first identifier 202 that is obtained from a first source, a second identifier 204 that is obtained from a second source that is different from the first source, and a token 206 that is obtained using the first identifier 202 and/or the second identifier 204. Any of the first identifier 202, the second identifier 204, and/or the token 206 may comprise a sequence of characters such as numbers, letters, and/or symbols. The token 206 may be employed by the control device 130a to cause the media playback system to perform various operations. Permissions 208 may be associated with the token that restrict which operations the control device 130a is permitted to cause the media playback system to perform. For example, the permissions 208 may indicate that the holder of a particular token is permitted to cause the playback device 110a to forward skip media in a playback queue but not to remove media from the playback queue. The control device 130a may obtain the credentials (e.g., the first identifier 202, the second identifier 204, and the token 206) in any of a variety of ways.

In some embodiments, the control device 130a may obtain the first identifier 202 from the playback device 110a. In these embodiments, the control device 130a may detect the playback device 110a is connected to the same network as the control device 130a, such as a LAN and/or a PAN, and send a request to the playback device 110a for the first identifier 202. The playback device 110a may, in turn, generate the first identifier 202 and respond to the control device 130a in one or more messages 210a. The playback device 110a may generate the first identifier 202 by itself or with the assistance of the computing system 201. For example, the playback device 110a may store a unique identifier and generate the first identifier based on the unique identifier stored locally. In another example, the playback device 110a may transmit a request for the first identifier to the computing system 201 that causes, in turn, the computing system 201 to generate the first identifier and respond to the playback device 110a with the first identifier.

In other embodiments, the control device 130a may obtain the first identifier 202 from another source separate from the playback device 110a. For example, the user of the control device 130a may be a guest user and the control device 130a may display a graphical user interface screen that requests the first identifier to be typed into an input field by the guest user. In this example, the guest user may obtain the first identifier 202 from an owner of the media playback system.

After the control device 130 has obtained the first identifier 202, the control device 130 may employ the first identifier 202 to obtain the second identifier 204 from the computing system 201. In some embodiments, the control device 130a may transmit a request for the second identifier 204 and the first identifier 202 to the computing system 201 via one or more messages 210b. The control device 130a may transmit the one or more messages 210b to the computing system 201 over, for example, a LAN and/or a WAN (e.g., the Internet). The computing system 201 may, in response to receiving the request for the second identifier 204 from the control device 130a, the computing system 201 may validate the authenticity of the first identifier 202. For example, the computing system 201 may store a list of known valid first identifiers and compare the first identifier 202 received from the control device 130a with the list of known valid first identifiers. If the computing system 201 determines that the first identifier 202 received from the control device 130a is valid, the computing system may generate the second identifier 204 and transmit the second identifier 204 to the control device 130a in one or more messages 210c over the LAN and/or WAN.

After the control device 130a has obtained the second identifier 204, the control device 130a may obtain the token 206 from the computing system 201 using the second identifier 204 and/or the first identifier 204. In some embodiments, the control device 130a may transmit a request for the token 206 and the second identifier 204 to the computing system 201 via one or more messages 210d. Additionally (or alternatively), the one or more messages 210d may comprise the first identifier 202. The control device 130a may transmit the one or more messages 210d to the computing system 201 over, for example, a LAN and/or a WAN (e.g., the Internet). The computing system 201 may, in response to receiving the request for the token 206 from the control device 130a, validate the authenticity of the second identifier 204 (and/or the first identifier 202). For example, the computing system 201 may store a list of known valid identifiers and compare the identifier(s) received from the control device 130a with the list of known valid identifiers. If the computing system 201 determines that the identifier(s) received from the control device 130a are valid, the computing system may generate the token 206 and transmit the token 206 to the control device 130a in one or more messages 210e.

After the control device 130a has obtained the token 206, the control device 130a may employ the token 206 to cause the playback device 110a to perform one or more operations. In some embodiments, the control device 130a may cause the playback device 110a to perform one or more operations by transmitting a request to perform an operation and the token 206 in one or more messages 210*f*. The one or more messages 210*f* may be, for example, transmitted over a network that both the control device 130*a* and the playback device 110 are connected to, such as a LAN or a PAN.

The playback device 110*a* may, in response to receipt of the request to perform an operation from the control device 130*a*, validate the authenticity of the token 206. The playback device 110*a* may validate the authenticity of the token alone and/or with the assistance of the computing system 201. For example, the playback device 110*a* may locally store a list of valid tokens and may determine whether the token 206 received from the control device 130*a* matches a token in the list of valid tokens. If the playback device 110*a* determines that the token 206 does not match a token in the list of valid tokens, the playback device 110*a* may transmit a validation request and the token 206 to the computing system 201. The computing system 201 may, in response to receiving the validation request, determine whether the token 206 is valid and transmit a response to the playback device 110*a* indicating whether the token 206 is valid.

Once the playback device 110*a* has determined that the token 206 is valid, the playback device 110*a* may determine whether the operation that the control device 130*a* requested is within the scope of permitted operations associated with the token 206. The playback device 110*a* may determine whether the operation is within the scope of permitted operations at least in part by obtaining the permissions 208 associated with the token 206 from the computing system 201. For example, the playback device 110*a* may transmit a request for the permissions 208 that comprises (or is accompanied by) the token 206 in one or more messages 210*g*. The computing system 201 may, in response to receiving the request, identify the permissions 208 associated with the token 206 and transmit the permissions 208 in one or more messages 210*h* to the playback device 110*a*. In turn, the playback device 110*a* may determine whether the request operation from the control device 130*a* matches one or more of the permitted operations in the permissions 208. If the requested operation from the control device 130*a* matches the one or more permitted operations in the permissions 208, the playback device 110*a* may perform the operation. Otherwise, the playback device 110*a* may reject the request from the control device 130*a* and not perform the operation.

Figure 3A:
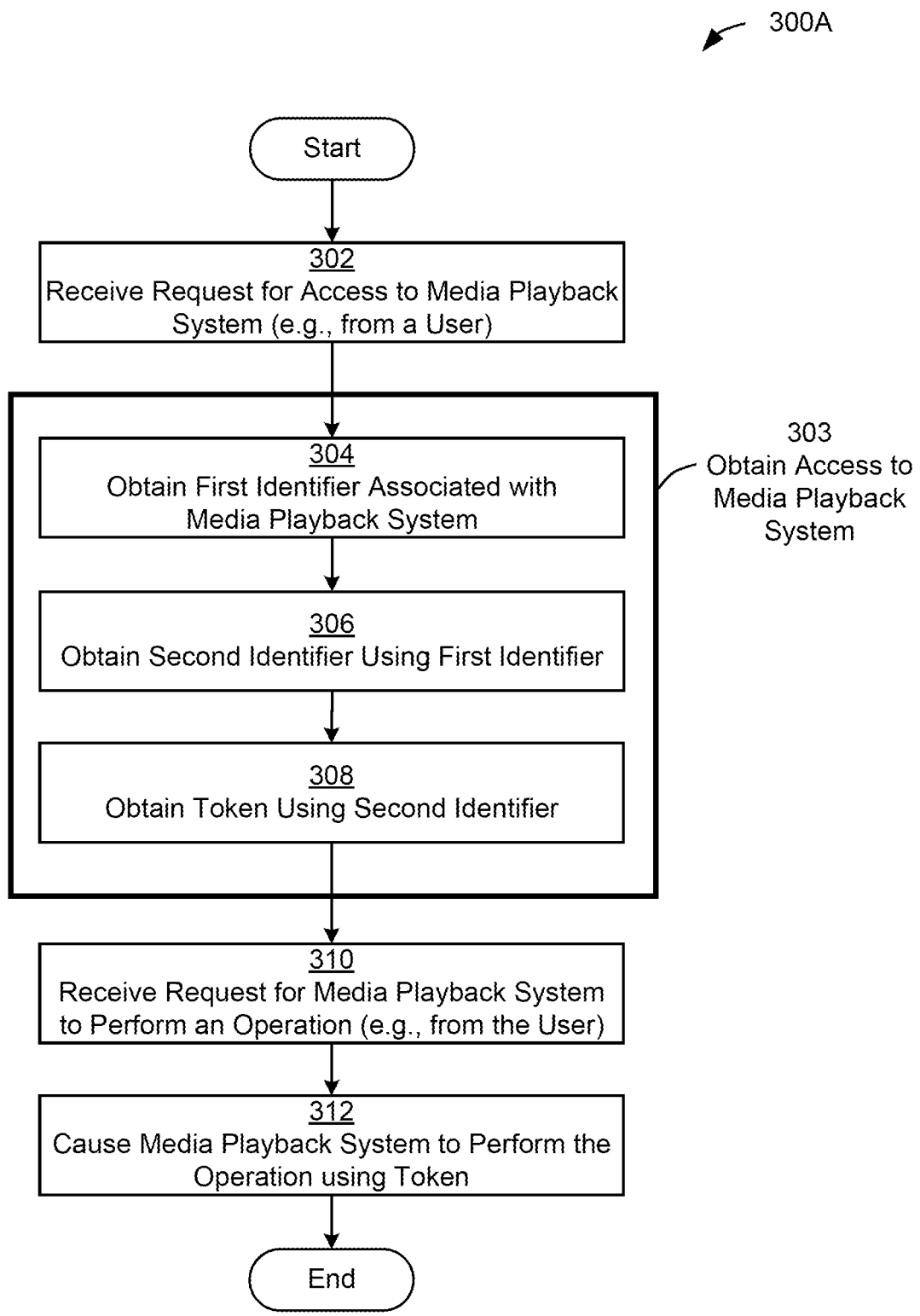
FIG. 3A is a flow diagram of an example method of operation for a computing device such as the control device in FIG. 2.

FIG. 3A shows an example process 300A that may be performed by a computing device, such as the control device 130*a*, to control operation of a media playback system comprising, for example, the playback device 110*a*. As shown, the process 300A includes an act 302 of receiving a request for access to the media playback system, an act 303 of obtaining access to the media playback system, an act 310 of receiving a request for the media playback system to perform an operation, and an act 312 of causing the media playback system to perform the operation using the token. The act 303 of obtaining access to the media playback system may comprise, for example, an act 304 of obtaining a first identifier associated with the media playback system, an act 306 of obtaining a second identifier using the first identifier, and an act 308 of obtaining a token using the second identifier.

In act 302, the computing device may receive a request for access to the media playback system. In some embodiments, the computing device may receive the request from a user via a GUI displayed on a display of the computing device. For example, the computing device may detect activation of a cast icon in the GUI of a third-party application, such as an application that provides audio content (e.g., songs, podcasts, video sound). Examples of such third-party applications that provide audio content include applications provided by media streaming services, such as music streaming services (e.g., SPOTIFY, PANDORA, AMAZON MUSIC, APPLE MUSIC, PLAY MUSIC, YOUTUBE MUSIC, IHEARTRADIO) and/or video streaming services (e.g., NETFLIX, HULU, AMAZON PRIME VIDEO, SLING, YOUTUBE TV). In another example, the computing device may detect startup of a native application associated with the media playback system (e.g., SONOS application).

In act 303, the computing device may obtain access to the media playback system in order to, for example, control the media playback system (e.g., request the media playback system to perform one or more operations). The computing device may obtain access to the media playback system in any of a variety of ways. As shown in FIG. 3A, the computing device may obtain access to the media playback system by performing act 304 of identifying a first identifier associated with the media playback system, act 306 of obtaining the second identifier using the first identifier, and/or act 308 of obtaining the token using the second identifier.

In act 304, the computing device may obtain the first identifier associated with the media playback system. In some embodiments, the computing device may obtain the first identifier from the media playback system, such as one or more playback devices in the media playback system. For example, the computing device may obtain the first identifier by transmitting a request for the first identifier to the media playback system and receiving, in response to the request, the first identifier from the media playback system. The mechanism of communication between the computing device and the media playback system may vary based on the particular implementation. For example, the computing device may be on the same network as the media playback system (e.g., the same LAN and/or PAN) and communicate with the media playback system over the network. In another example, the computing device may communicate with the media playback system using acoustic signals via one or more microphones and one or more speakers in each of the computing device and the media playback system. These acoustic signals may have any of a variety of frequencies depending on the particular implementation. For example, the acoustic signals have frequencies within the range of human hearing (e.g., between 20 Hz and 20 Khz), outside the range of human hearing (e.g., below 20 Hz or above 20 kHz), or near the edge of the range of human hearing (e.g., between 18 kHz and 20 kHz).

It should be appreciated that the computing device may obtain the first identifier via another source separate and apart from the media playback system. In some embodiments, the computing device may obtain the first identifier from the user via one or more input fields in a GUI. For example, the owner of the media playback system may be provided on their own computing device (e.g., during setup of the media playback system and/or upon request anytime after setup) a list of one or more first identifiers that the owner can provide at their discretion to other individuals (e.g., to guests). In this example, the owner may provide a first identifier to a guest user (e.g., verbally tell the guest user the first identifier, send the first identifier to the guest user in a written format) such that the guest user can enter the first identifier into an input field in the GUI displayed on their own computing device.

In act 306, the computing device may obtain a second identifier using the first identifier. The computing device may obtain the second identifier from a source that is different from the source that provided the first identifier. In some embodiments, the computing device may obtain the second identifier from a computing system (e.g., computing system 201). For example, the computing device may transmit a request for the second identifier and the first identifier to the computing system. The computing device may receive, in response to the request for the second identifier, the second identifier from the computing system.

In some embodiments, the computing device may transmit additional information separate and apart from the first identifier to the computing system while obtaining the second identifier. For example, the computing device may obtain user login credentials (e.g., a username, a password, and/or a biometric) from the user for an account owned by the user that is maintained by the computing system. In this example, the computing device may provide the user login credentials to the computing system as part of the request for the second identifier and/or after transmitting the request for the second identifier. The user login credentials may be employed by the computing system to, for example, distinguish between different types of users. For example, the computing system may determine whether the received login credentials match the login credentials of the owner user (e.g., as established during the setup process for the media playback system) or are associated with another user, such as a registered guest user. In instances where the computing device fails to provide login credentials for a user account, the computing system may identify the user as simply an anonymous guest. The computing system may associate the determined user type (e.g., an owner user, a registered guest user, an anonymous guest user) with the second identifier provided to the user such that, for example, the user is provided a level of access to the media playback system that is tailored to their determined user type when subsequently interacting with the computing system and/or the media playback system.

In act 308, the computing device may obtain the token using the second identifier. The computing device may obtain the token from, for example, the computing system. In some embodiments, the computing device may transmit a request for the token and the second identifier (and/or the first identifier) to the computing system. The computing device may, in turn, receive the token from the computing system. The token may be employed to request the media playback system to perform one or more operations.

In some embodiments, a token may only be employed to cause the media playback system to perform certain operations. The particular operations that a given token may be employed to request may vary based on, for example, the type of user. As mentioned above with respect to act 306, the computing device may obtain user login credentials from the user that may be employed by the computing system to distinguish between different types of users and associate a user type with the second identifier. Such an association between the second identifier and user type may be employed by the computing system to identify a set of permitted operations to associate with a token. For example, an owner user may be permitted to perform more operations than a registered guest user, and the registered guest user may be permitted to perform more operations than an anonymous guest user. An example set of permitted operations associated with each of three different types users (e.g., an owner user, a registered guest user, and an anonymous guest user) are shown below in Table 1:

TABLE 1

Example Users Types and Permitted Operations

| Example User Type | Example Permitted Operations |
| --- | --- |
| First User Type (e.g., Owner User) | Play Media; Pause Media; Change Volume; Forward Skip Media in a Playlist; Backward Skip Media in a Playlist; Reorder Media in a Playlist; Add Media to a Playlist; Remove Media from a Playlist; Change Media playback system Settings (e.g., Change Groupings; Change Bonded Pairs; etc.) |
| Second User Type (e.g., Registered guest User) | Play Media; Pause Media; Change Volume; Forward Skip Media in a Playlist; Backward Skip Media in a Playlist; Reorder Media in a Playlist; Add Media to a Playlist; Remove Media from a Playlist |
| Third User Type (e.g., Anonymous Guest User) | Play Media; Pause Media; Change Volume; Forward Skip Media in a Playlist; Backward Skip Media in a Playlist |

It should be appreciated that various operations may be associated with different types of users in any way and Table 1 above is only one example implementation. For example, any combination of the following operations: (1) play media, (2) pause media, (3) change volume, (4) forward skip media in a playlist, (5) backward skip media in a playlist, (6) reorder media in a playlist, (7) add media to a playlist, (8) remove media from a playlist, (9) change media playback system settings (e.g., change groupings, change bonded pairs, etc.), (10) shuffle media in a playlist, (11) favorite media, and (12) unfavorite media may be associated with a given user type. As discussed above, different combinations of operations may be associated with different types of users. In some implementations, the same combination of operations may be associated with at least two different types of users. Such implementations may be advantageous in scenarios where an owner may want to easily re-configure permissions for a set of non-owner users that may typically have the same level of access to the media playback system. For example, a media playback system in a commercial establishment may have an owner user type and a manager user type with the same associated set of permitted operations. In this example, the owner may easily re-configure the permissions associated with the all of the managers all at once by re-configuring the manager user type.

In act 310, the computing device may receive a request for the media playback system to perform an operation. The computing device may, for example, receive the request for the media playback system to perform an operation from a user via a GUI displayed on the computing device. For example, the computing device may detect activation of a forward skip button in the GUI configured to trigger the media playback system to skip to the next song.

In act 312, the computing device may cause the media playback system to perform the operation using the token. For example, the computing device may transmit a request for the media playback system to perform the operation and the token. Should the media playback system determine that the token is valid and/or the requested operation is within the set of permitted operations associated with the token, the media playback system may perform the operation.

It should be appreciated that one or more of the credentials including the first identifier, the second identifier, and/or the token may expire after a certain period of time. Limiting the lifespan of credentials may advantageously enhance the security of the media playback system. For example, a wrongdoer that steals an old token from a computing device of an authenticated user cannot control the media playback system. The period of time after which the particular credentials expire may vary based on the particular implementation. For example, the credentials may be set to expire between 1 and 48 hours after creation (e.g., 1 hour, 6 hours, 12 hours, 24 hours, 36 hours, 48 hours). Further, the expiration time of particular credentials may vary based on the type of user that the credentials are associated with. For example, a second identifier and/or a token associated with an owner user may last longer (including never expiring) than a second identifier and/or a token associated with a registered guest user and/or an anonymous guest user. Further, the second identifier and/or token associated with a registered guest user may last longer than a second identifier and/or token associated with an anonymous guest user.

In embodiments where one or more of the credentials expire, the computing device may perform one or more additional acts when a particular credential expires to automatically renew the expired credential (e.g., in situations where the user is still controlling the media playback system). For example, the computing device may detect that the token has expired and the user has recently requested the media playback system to perform an operation (e.g., request the media playback system to perform an operation within a threshold period of time, such as the last 10 minutes, the last 15 minutes, or the last 30 minutes) and, in response, automatically obtain a new token from the computing system by repeating one or more of acts 304, 306, and/or 308. Thus, the user may still be able to seamlessly control the media playback system without having to wait for the computing device to obtain a new token in response to requesting the media playback system perform another operation.

Figure 3B:
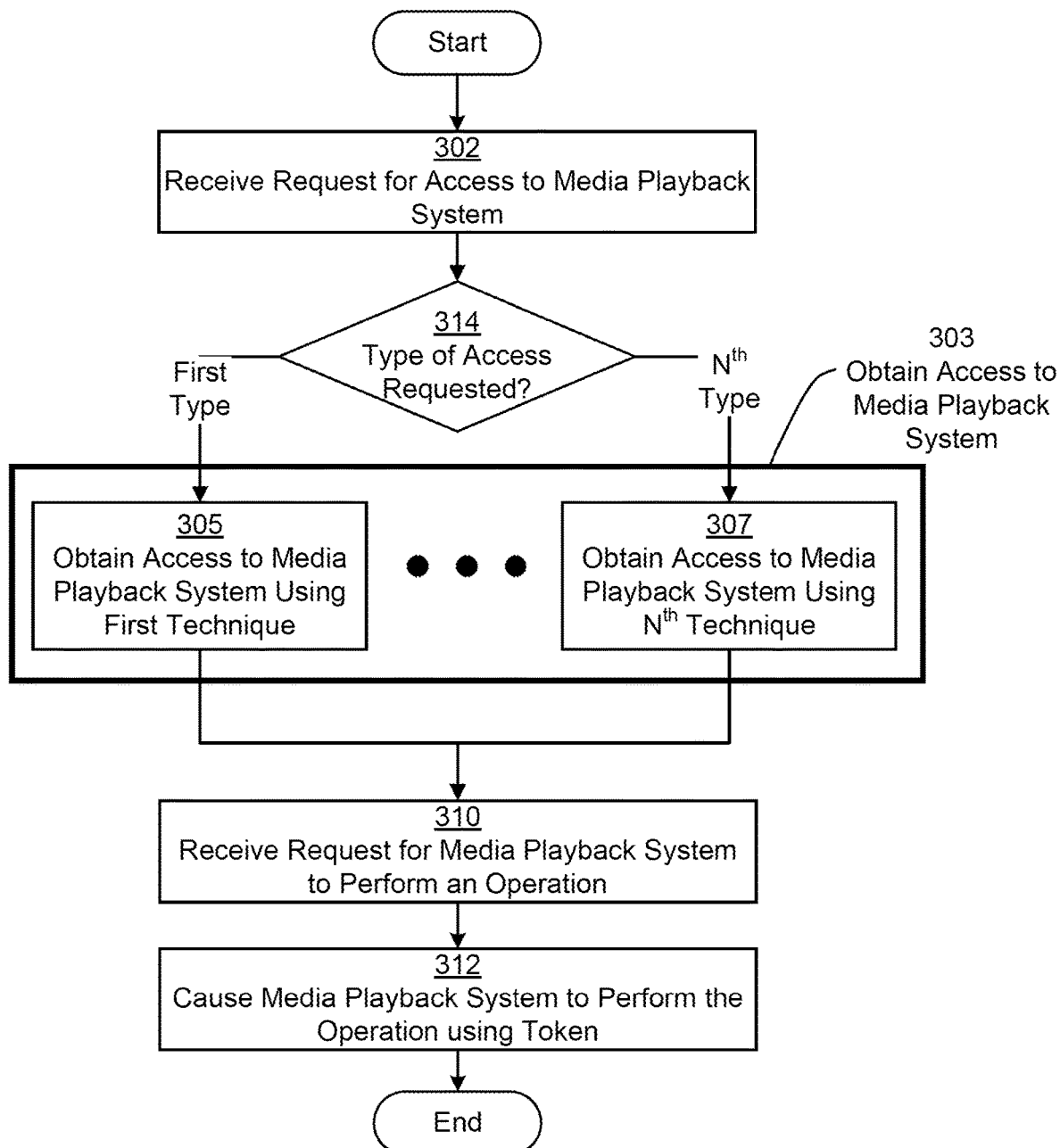
FIG. 3B is a flow diagram of another example method of operation for a computing device such as the control device in FIG. 2.

In some embodiments, the computing device may obtain access to the media playback system using different techniques based on the type of access requested. For example, the computing device may obtain a first level of access (e.g., owner user access) to the media playback system using a first technique and obtain a second, different level of access (e.g., registered guest user access) to the media playback system using a second technique that is different from the first technique. An example of such a process is shown in FIG. 3B by process 300B that may be performed by a computing device (e.g., a control device). Relative to process 300A in FIG. 3A, process 300A adds an act 314 of determining a type of access requested and replaces acts 304, 306, and 308 in act 303 of obtaining access to the media playback system with an act 305 of obtaining access to the media playback system using a first technique and an act 307 of obtaining access to the media playback system using an $N^{th}$ technique.

In act 314, the computing device may determine the type of access requested. In some embodiments, the computing device may determine the type of access requested based on input from the user via a GUI. For example, the computing device may display a GUI comprising a plurality of selectable elements that are each associated with a different level of access. In this example, the computing device may detect activation of one of the selectable elements and identify the type of access that is associated with the activated selectable element as the requested type of access. In another example, the computing device may display a GUI comprising input fields for user login credentials. In this example, the computing device may transmit the received user login credentials to a computing system along with information regarding the particular media playback system that is to be accessed. In this example, the computing system may determine the type of access that is appropriate given the user credentials (e.g., owner user access, registered guest user access, or anonymous guest access) and provide an indication of the type of access to the computing device.

In other embodiments, the computing device may determine the type of access requested without input from the user. For example, during setup of the media playback system, the computing device may store an identifier indicating that the computing device was used for setup of the media playback system and is associated with the owner. In this example, the computing device may determine whether the computing device has the identifier and, responsive to determining that the computing device has the identifier, obtain the highest level of access (e.g., owner user access). Otherwise, the computing device may obtain a lower level of access (e.g., registered guest user access).

Once the computing device has identified the type of access requested, the computing device may proceed to obtain access using a technique that is tailored to the particular type of access being requested. For example, the computing device may perform act 305 and obtain access to the media playback system using a first technique in response to determining that a first type of access to the media playback system was requested. Similarly, the computing device may perform act 307 and obtain access to the media playback system using an $N^{th}$ technique that is different from the first technique. Any of the various techniques to obtain access to the media playback system may comprise one or more of acts 304, 306, and/or 308 described above with reference to FIG. 3A.

In some embodiments, the techniques employed to gain access for owner users require fewer operations than the techniques employed to gain access for non-owner users (e.g., registered guest users and/or anonymous guest users). Thus, the owners (who may interact with the media playback system frequently) may be able to obtain access to the media playback devices faster than non-owner users. For example, the computing device may generate a token (e.g., during setup of the media playback system) for the owner that never expires. Thus, the computing device may obtain access to the media playback device simply by retrieving the token from memory. In contrast, non-owner users may only be able obtain tokens by performing one or more of acts 304, 306, and/or 308 described above. Further, the tokens for non-owner users may expire after a set period of time (e.g., 12 hours) to force the non-owner users to perform one or more of acts 304, 306, and/or 308 described above each time before obtaining access to the media playback system.

Figure 4:
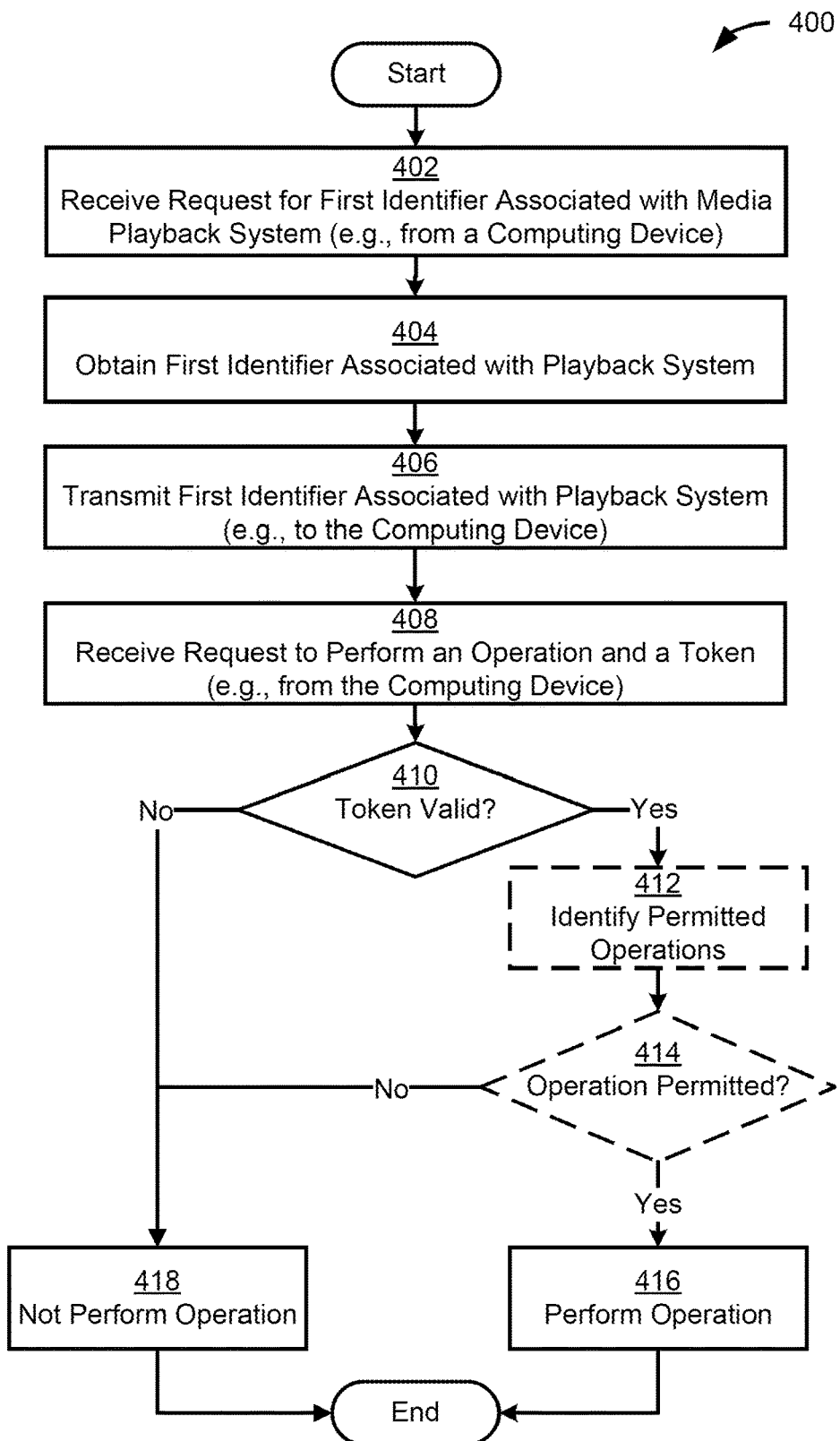
FIG. 4 is a flow diagram of an example method of operation for a media playback system such as the playback device in FIG. 2.

FIG. 4 shows an example process 400 that may be performed by a media playback system comprising the playback device 110a to authenticate a computing device (e.g., control device 130a) seeking to control the media playback system. The operations in process 400 may be performed by a single device within the media playback system (e.g., only playback device 110a) or distributed among a plurality of devices in the media playback system (e.g., distributed among multiple playback devices in the media playback system). For example, a first playback device may perform a first subset of acts in process 400 and a second playback device may perform a second, different subset of acts in process 400. As shown, process 400 comprises an act 402 of receiving a request for a first identifier associated with the media playback system, an act 404 of obtaining the first identifier associated with the media playback system, an act 406 of transmitting the first identifier associated with the media playback system, an act 408 of receiving a request to perform an operation and a token, an act 410 of determining whether the token is valid, an act 412 of identifying permitted operations, an act 414 of determining whether the operation is permitted, an act 416 of performing the operation, and an act 418 of not performing the operation.

In act 402, the media playback system may receive a request for a first identifier associated with the media playback system. The media playback system may receive the request for the first identifier from, for example, a computing device. The media playback system may receive the request via any of a variety of communication mechanisms. In some embodiments, the media playback system may be connected to the same network as the computing device, such as a LAN and/or a PAN. Additionally (or alternatively), the media playback system may receive the request via acoustic signals detected by one or more microphones in the media playback system.

In act 404, the media playback system may obtain the first identifier associated with the media playback system. In some embodiments, the media playback system may generate the first identifier itself. In these embodiments, the media playback system may locally store a unique identifier associated with the media playback system (e.g., a household ID) and generate the first identifier based on the unique identifier. For example, the media playback system may transmit the unique identifier stored locally as the first identifier. In another example, the media playback system may generate the first identifier at least in part by combining the unique identifier with one or more other values such as an expiration time of the first identifier (e.g., in implementations where the first identifier expires) and/or a secret code. In embodiments where the media playback system generates the first identifier, the media playback system may additionally transmit the generated first identifier to the computing system such that the computing system can successfully validate the authenticity of a copy of the first identifier received from another source (e.g., a computing device attempting to obtain a second identifier and/or a token from the computing system).

In other embodiments, the media playback system may generate the first identifier with the assistance of another device. For example, the media playback system may transmit a request for the first identifier and a unique identifier associated with the media playback system to the computing system (e.g., over a WAN and/or a LAN). The media playback system may receive, in response to transmitting the request, the first identifier.

In act 406, the media playback system may transmit the first identifier associated with the media playback system. The media playback system may transmit the first identifier over, for example, a LAN and/or a PAN to the computing device. In other examples, the media playback system may transmit the first identifier to the computing device via acoustic signals generated by one or more speakers in the media playback system.

In act 408, the media playback system may receive a request to perform the operation and a token. The media playback system may receive the request to perform the operation and the token from, for example, the computing device. The media playback system may receive the request to perform the operation and/or the token over, for example, a LAN and/or a PAN from the computing device. For illustration, the media playback system may receive the request to perform the operation and/or the token via BLUETOOTH and/or a Wi-Fi network from the computing device. In other examples, the media playback system may receive the request to perform the operation and/or the token via acoustic signals detected by one or more microphones in the media playback system. In some embodiments, the token may be received via a different communication channel than the request to perform the operation. For example, the token may be transmitted via acoustic signals while the request to perform the operation may be transmitted over a LAN and/or a PAN. In another example, the token may be transmitted using BLUETOOTH while the request to perform the operation may be transmitted via a Wi-Fi network.

In act 410, the media playback system may determine whether the token is valid. The media playback system may determine whether the token is valid using any of a variety of techniques. The media playback system may, for example, transmit the token to the computing system for validation. The media playback system may receive a response from the computing system indicative of whether the token is valid. If the token is valid, the media playback system may proceed to act 412 and identify the permitted operations. Otherwise, the media playback system may proceed to act 418 and not perform the operation.

In some embodiments, the media playback system may maintain a cache of valid tokens (e.g., tokens that have been recently validated and/or an expiration time associated with the valid tokens) in a local memory to reduce the communication traffic between the media playback system and the computing system. In these embodiments, the media playback system may store a table comprising a list of previously received tokens and the response from the computing system indicating whether each of the tokens is valid or invalid (and/or an expiration time for one or more valid tokens). As a result, the media playback system may, upon receipt of a token, first check the cache of tokens to see if the media playback system has previously received an indication from the computing system as to whether the token is valid or invalid. If the token matches one or more tokens in the cache of tokens, the media playback system may determine whether the token is valid based on the cache of tokens without contacting the computing system. For example, the media playback system may receive a token that, while previously valid, has since expired based on the expiration time associated with the token in the cache of tokens. In this example, the media playback system may determine that the token is not valid. If the token does not match one or more tokens in the cache of valid tokens, the media playback system may transmit the token to the computing system for validation as mentioned above.

In act 412, the media playback system may identify the permitted operations associated with the token. The media playback system may identify the permitted operations associated with the token is valid using any of a variety of techniques. The media playback system may, for example, transmit a request for permissions and the token to the computing system for validation. The media playback system may receive a response from the computing system indicative of the permitted operations associated with the token.

In some embodiments, the media playback system may maintain a cache of permissions in a local memory to reduce the communication traffic between the media playback system and the computing system. In these embodiments, the media playback system may store a table comprising a list of valid tokens and permitted operations associated with each of the tokens. As a result, the media playback system may first check the cache of permissions to see if the media playback system has previously received an indication from the computing system as to the permitted operations associated with the token. If the token matches one or more tokens in the cache of permissions, the media playback system may identify the permitted operations based on the cache of permissions without contacting the computing system. For example, the media playback system may receive a token that matches one or more tokens in the cache of permissions and identify the set of permitted operations associated with the token from the cache of permissions. If the token does not match one or more tokens in the cache of permissions, the media playback system may transmit the token to the computing system to obtain the set of permissions operations as mentioned above.

In act 414, the media playback system may determine whether the operation is permitted. The media playback system may determine whether the operation is valid at least in part by, for example, determining whether the operation matches one or more operations in the set of permitted operations. If the operation matches one or more operations in the set of permitted operations, the media playback system may determine that the operation is permitted and proceed to act 416 and perform the operation. Otherwise, the media playback system may determine that the operation is not permitted and proceed to act 418 and not perform the operation.

It should be appreciated that one or more acts may be omitted from process 400 without departing from the scope of the present disclosure. For example, acts 412 and/or 414 may be omitted in architectures where the media playback system only has a single type of user (and/or a single user). In such architectures, all of the tokens may have the same set of permitted operations (e.g., all operations). As a result, acts 412 and 414 may be redundant in such implementations.

Figure 5A:
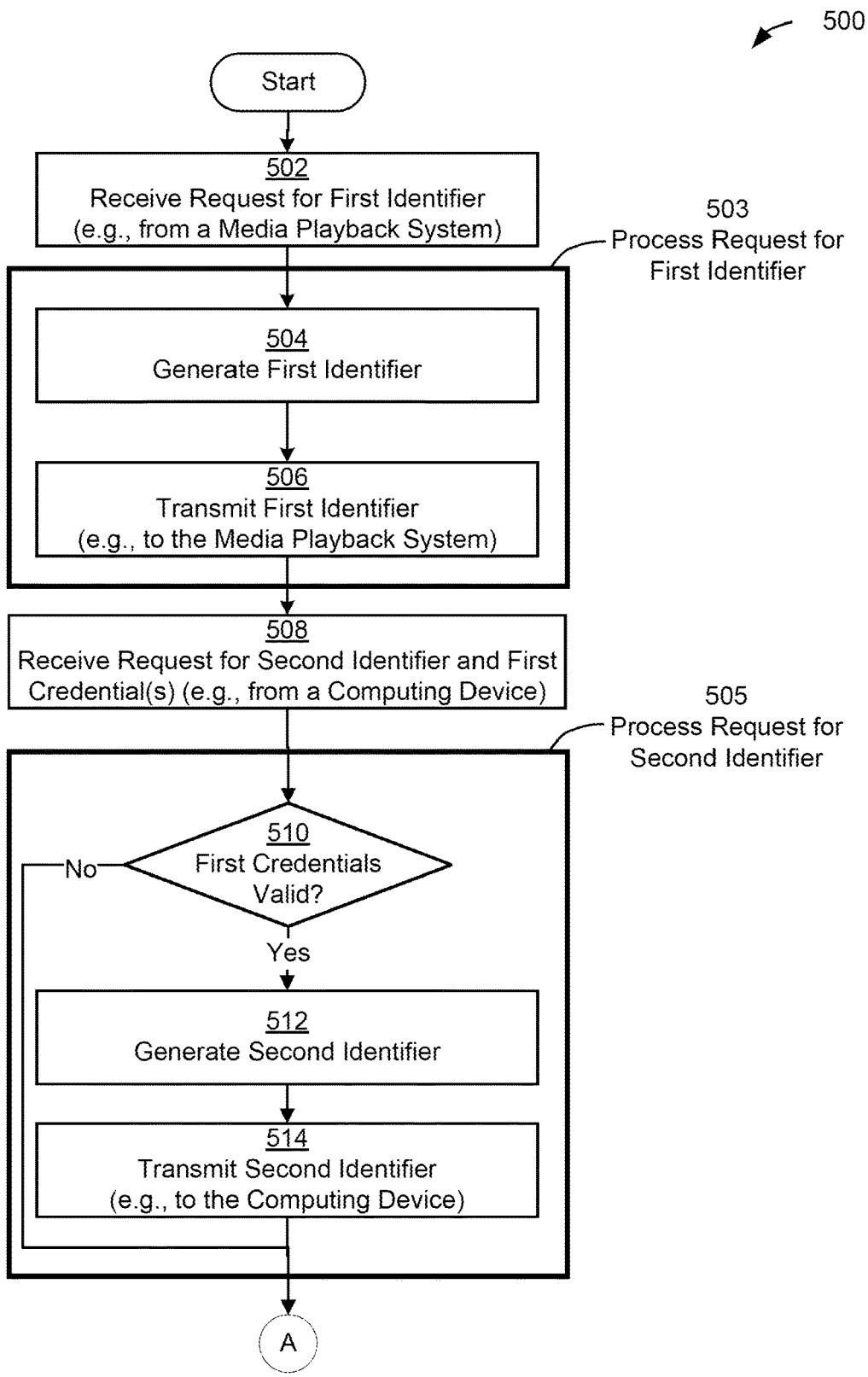
FIGS. 5A and 5B are a flow diagram of an example method of operation for a computing system such as the computing system in FIG. 2.
Figure 5B:
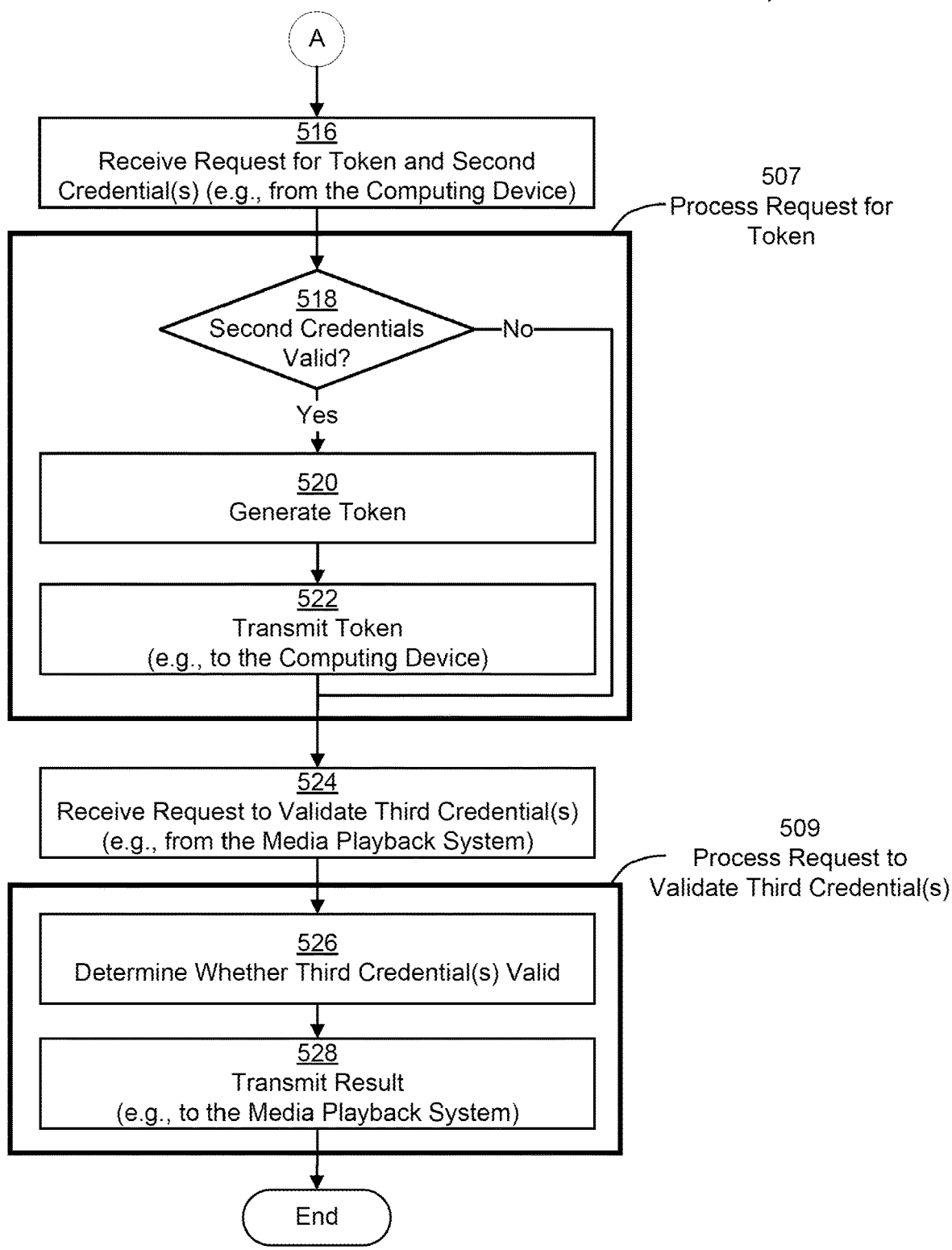

FIGS. 5A and 5B show an example process 500 that may be performed by computing system 201 to authenticate a computing device (e.g., control device 130*a*) attempting to obtain access to a media playback system comprising playback device 130*a*. The operations in process 500 may be performed by a single computing device in the computing system 201 or distributed among a plurality of computing devices in the computing system 201. For example, a first computing device may perform a first subset of acts in process 500 and a second computing device may perform a second, different subset of acts in process 500. As shown in FIGS. 5A and 5B, the process 500 comprises an act 502 of receiving a request for a first identifier, an act 503 of processing the request for the first identifier, an act 508 of receiving a request for a second identifier and first credential(s), an act 505 of processing the request for the second identifier, an act 516 of receiving a request for a token and second credential(s), an act 507 of processing the request for the token, an act 516 of receiving a request to validate third credentials, and an act 509 of processing the request to validate the third credentials. The act 503 of processing the request for the first identifier may comprise an act 504 of generating the first identifier and an act 506 of transmitting the first identifier. The act 505 of processing the request for the second identifier may comprise an act 510 of determining whether the first credentials are valid, an act 512 of generating the second identifier, an act 514 of transmitting the second identifier. The act 507 of processing the request for the token may comprise an act 518 of determining whether the second credentials are valid, an act 520 of generating the token, and an act 522 of transmitting the token. The act 509 of processing the request to validate the third credential(s) may comprise an act 526 of determining whether the third credential(s) are valid and an act 528 of transmitting the result.

In act 502, the computing system may receive a request for a first identifier associated with the media playback system. The computing system may receive the request for the first identifier from, for example, the media playback system (e.g., over a WAN and/or a LAN). In some embodiments, the request for the first identifier may comprise (and/or be accompanied by) a unique identifier associated with the media playback system (e.g., a household ID). For example, the media playback system may have been assigned a household ID during a setup process where the media playback system is registered with the computing system.

In act 503, the computing system may process the request for the first identifier. The computing system may process the request for the first identifier in any of a variety of ways. In some embodiments, the computing system may process the request for the first identifier at least in part by performing acts 504 and/or 506.

In act 504, the computing system may generate the first identifier. The computing device may generate the first identifier by, for example, generating a sequence of characters (e.g., a unique sequence of characters). The sequence of characters may, in some embodiments, be generated based on one or more parameters. For example, the sequence of characters may be generated based on a unique identifier associated with the media playback system received in act 502. Additionally (or alternatively), the first identifier may be configured to expire after an expiration time is reached and the first identifier may be generated based on the expiration time of the first identifier. For illustration, the computing system may generate the first identifier at least in part based on one or more of: (1) the unique identifier associated with the media playback system (e.g., a household ID); (2) an expiration time of the first identifier; and (3) a secret code (e.g., a non-shared secret code such as a 128 random bits). For example, the first identifier may comprise a combination of a household ID, an expiration time, and a secret code. The first identifier may be, in some embodiments, digitally signed (e.g., cryptographically signed) to further enhance security. For example, digitally signing the first identifier may enable the computing system to subsequently validate the authenticity of the first identifier without having to directly store the first identifier.

In act 506, the computing system may transmit the first identifier. For example, the computing system may transmit the first identifier to the media playback system, such as a playback device of the media playback system. The computing system may, in some embodiments, transmit the first identifier to the same device (e.g., playback device) within the media playback system that the computing system received the request for the first identifier from. In other embodiments, the computing system may transmit the first identifier to a different device within the media playback system than the device in the media playback system that the computing system received the request for the first identifier from in act 502. For example, the computing system may receive the request for the first identifier from a first playback device in the media playback system in act 502 and transmit the first identifier to a second playback device in the media playback system that is different from the first playback device.

In act 508, the computing system may receive the request for the second identifier and first credentials. The request for the second identifier may comprise the first credentials and/or the first credentials may be transmitted alongside the request for the second identifier (e.g., transmitted in separate messages). The computing system may receive the request for the second identifier and the first credentials from a computing device (e.g., over a WAN and/or a LAN). The first credentials may comprise any of a variety of credentials that may be employed to validate the authenticity of the request for the second identifier. For example, the first credentials may comprise the first identifier generated by the media playback system when the request for the second identifier is authentic. The computing system may validate the first credentials to, for example, prove that the computing system received the request for the second identifier from a computing device that successfully communicated with the media playback system. Additionally, the request for the first identifier may comprise (and/or be accompanied by) a unique identifier associated with the computing device, such as a client ID.

In act 505, the computing system may process the request for the second identifier. The computing system may process the request for the first identifier in any of a variety of ways. In some embodiments, the computing system may process the request for the second identifier at least in part by performing acts 510, 512, and/or 514.

In act 510, the computing system may determine whether the first credentials are valid. The computing system may, for example, determine whether the first credentials comprises the first identifier generated in act 504 to, for example, prove that the computing device that issued the request for the second identifier successfully communicated with the media playback system (e.g., over a Wi-Fi network). The computing system may determine whether the first credentials comprises the first identifier in any of a variety of ways. In some embodiments, the computing system may store the first identifier generated in act 503 (e.g., in a table) and compare the stored first identifier with a sequence of characters in the first credentials to determine whether there is a match. In other embodiments, the computing system may determine whether the first credentials comprise the first identifier without having to directly store the first identifier generated in act 503. For example, the computing system may digitally sign the first identifier and store one or more keys. In this example, the computing system may employ the one or more keys (instead of the first identifier itself) to determine whether a received sequence of characters matches the first identifier. If the computing system determines that the first credentials are valid, the computing system may proceed to act 512 and generate the second identifier. Otherwise, the computing system may not perform acts 512 and/or 514.

As mentioned above, in some embodiments, the first identifier may expire after an expiration time. In these embodiments, the computing system may determine whether the first credentials are valid by additionally determining whether the first identifier has expired. For example, the computing system may store an expiration time with the first identifier and/or one or more keys employed to cryptographically sign the first identifier (e.g., in a table). In this example, the computing may retrieve the expiration time from memory and determine whether the first identifier has expired.

In act 512, the computing system may generate the second identifier. The computing device may generate the second identifier by, for example, generating a sequence of characters (e.g., a unique sequence of characters). The sequence of characters may, in some embodiments, be generated based on one or more parameters. For example, the sequence of characters may be generated based on a unique identifier associated with the computing system received in act 508 such as a client ID. Additionally (or alternatively), the second identifier may be configured to expire after an expiration time is reached and the second identifier may be generated based on the expiration time of the second identifier. For illustration, the computing system may generate the second identifier based at least in part on one or more of the following: (1) the unique identifier associated with the computing device (e.g., a client ID); (2) an expiration time of the second identifier; and (3) a secret code (e.g., a non-shared secret code such as a 128 random bits). For example, the second identifier may comprise a combination of the client ID, the expiration time, and the secret code. The second identifier may be, in some embodiments, digitally signed (e.g., cryptographically signed) to further enhance security. For example, cryptographically signing the second identifier may enable the computing system to subsequently validate the authenticity of the second identifier without having to directly store the second identifier.

In some embodiments, the computing system may identifier a user type and/or associated the identifier user type with the second identifier. Example user types include, for example, owner users, registered guest users, and anonymous users. Each type of user may be provided a different level of access to the media playback system as described above with reference to Table 1. For example, owner users may have a greater level of access than non-owner users. The computing system may distinguish between users based on information received from the computing device. In some embodiments, the computing system may receive user login credentials (e.g., a username, a password, and/or a biometric) for an account owned by the user from the computing device (e.g., received as part of the request for the second identifier and/or received separately). In these embodiments, the user login credentials may be employed by the computing system to, for example, distinguish between different types of users. For example, the computing system may determine whether the received login credentials match the login credentials of the owner user (e.g., as established during the setup process for the media playback system) or are associated another user, such as a registered guest user. In instances where no login credentials for a user account are provided by the computing device, the computing system may identify the user as simply an anonymous guest. Once the computing system has determined the user type, the determined user type may be associated with the second identifier such that, for example, the user is provided a level of access to the media playback system that is tailored to their determined user type when subsequently interacting with the computing system and/or the media playback system.

In act 514, the computing system may transmit the second identifier. For example, the computing system may transmit the second identifier to the computing device, such as the computing device that the request for the second identifier originated.

In act 516, the computing system may receive a request for a token and second credentials. The request for the token may comprise the second credentials and/or the second credentials may be transmitted alongside the request for the token (e.g., transmitted in separate messages). The computing system may receive the request for the token and the second credentials from a computing device. The second credentials may comprise any of a variety of credentials that may be employed to validate the authenticity of the request for the token. For example, the second credentials may comprise the second identifier previously generated by the computing system. Additionally (or alternatively), the second credentials may comprise the first identifier generated by the media playback system.

In act 507, the computing system may process the request for the token. The computing system may process the request for the token in any of a variety of ways. In some embodiments, the computing system may process the request for the token at least in part by performing acts 518, 520, and/or 522.

In act 518, the computing system may determine whether the second credentials are valid. For example, the computing system may determine whether the second credentials comprise a valid second identifier and/or a valid first identifier. In some embodiments, the computing system may store the second identifier generated in act 512 and/or the first identifier generated in act 504. In these embodiments, the computing system may compare the stored second identifier and/or the first identifier with the sequence(s) of characters in the second credentials to determine whether there is a match. In other embodiments, the computing system may determine whether the second credentials comprise the second identifier and/or the first identifier without having to directly storing the identifier(s). For example, the computing system may cryptographically sign the second identifier and/or the first identifier and store one or more keys. In this example, the computing system may employ the one or more keys (instead of the identifier(s)) to determine whether a received sequence of characters matches the second identifier and/or the first identifier. If the computing system determines that the second credentials are valid, the computing system may proceed to act 520 and generate the token. Otherwise, the computing system may not perform acts 520 and/or 522.

As mentioned above, in some embodiments, the second identifier and/or the first identifier may expire after an expiration time. In these embodiments, the computing system may determine whether the second credentials are valid by additionally determining whether the second identifier and/or the first identifier has expired. For example, the computing system may store an expiration time with the identifier(s) and/or one or more keys employed to digitally sign the identifier(s). In this example, the computing may retrieve the expiration time(s) from memory and determine whether the identifier(s) have expired.

In act 520, the computing system may generate the token. The computing device may generate the token by, for example, generating a sequence of characters (e.g., a unique sequence of characters). The sequence of characters may, in some embodiments, be generated based on one or more parameters. For example, the sequence of characters may be generated based on the first and/or second identifier received in act 518, a secret code, and/or an expiration time of the token (e.g., in instances where the token expires). In other embodiments, the token may be generated without any inputs. For example, the token may be a randomly generated sequence of characters with a fixed length or a variable length.

As mentioned above, in some embodiments, the computing system may provide different levels of access to the media playback system to different types of users. In these embodiments, the computing system may identify the type of user that requested the token and associate a set of permitted operations with the token that matches the user type. The computing system may use information received from the computing device in act 516, such as the second identifier, to distinguish between different types of users. For example, the computing system may have identified a user type in act 512 and associated the identified user type with the second identifier (e.g., in a table). Thus, the computing system may readily identify the user type by identifying the user type associated with the particular second identifier received from the computing system. Once the computing system has identified the user type, the computing device may associate a set of permitted operations that corresponds to the identifier user type to the token. For example, the computing system may determine that a particular user is an owner user and associate all of the operations that the media playback system is capable of performing with the token. In another example, the computing system may determine that a particular user is a non-owner user and associate a portion of the operations that the media playback system is capable of performing with the token.

In act 522, the computing system may transmit the token. For example, the computing system may transmit the token the computing device, such as the computing device that the request for the token originated.

In act 524, the computing system may receive a request to validate third credentials. The request to validate the third credentials may comprise, for example, a token that needs to be validated to determine whether the token is valid or invalid. The computing system may receive the request to validate the third credentials from, for example, the media playback system.

In act 509, the computing system may process the request to validate the third credentials. The computing system may process the request to validate the third credentials in any of a variety of ways. In some embodiments, the computing system may process the request to validate the third credentials at least in part by performing acts 526 and/or 528.

In act 526, the computing system may determine whether the third credentials are valid. For example, the computing system may determine whether the token is valid or invalid. In some embodiments, the computing system may compare the token with the sequence(s) of characters in the second credentials to determine whether there is a match.

In act 528, the computing system may transmit the result. For example, the computing system may transmit an indication of whether the third credentials are valid to the media playback system. Additionally (or alternatively), the computing system may transmit permission information associated with the token in instances where the token is valid. For example, the computing system may transmit the list of permitted operations that are associated with the token (e.g., the permitted operations identified in act 520) to the media playback system.

It should be appreciated that, in some embodiments, the permissions provided to different types of users may be configurable by the owner user of the media playback system. For example, the owner user may forbid particular types of users (e.g., anonymous guest users and/or registered guest users) from accessing the media playback system. In this example, the computing system may reject all requests for credentials (e.g., first identifiers, second identifiers, and/or tokens) from such users. Additionally (or alternatively), the particular permitted operations associated with any given user type may be configurable by the owner user. For example, the owner user may add or remove permitted operations associated with registered guest users and/or anonymous users (e.g., as shown in Table 1). Thus, the owner user may control both the types of users that have access to the media playback system and the level of access that each type of user is granted to the media playback system.

In some embodiments, the control device 130a may seek to identify a playback device 110a in a media playback system that is connected to the same network as the control device 130a, such as a LAN and/or a PAN. The control device 130a may attempt to identify the playback device 110a in response to any of a variety of stimuli such as detection of an application being opened, detection of a new network connection, and/or a certain amount of time expiring since the control device 130a previously attempted to identify the playback device 110. FIG. 6 shows an example message flow that may be employed between the control device 130a and the playback device 110a where the control device 130a detects a media playback system comprising the playback device 110a. As shown in FIG. 6, the message flow comprises one or more broadcast messages 602, one or more responses messages 604, and a show media playback system availability action 606.

The control device 130a may transmit a broadcast 602 over a network (e.g., a LAN and/or a PAN). The playback device 110a may detect the broadcast 602 and respond to the broadcast with a response 604. The response messages 604 may comprise, for example, information that uniquely identifiers the media playback system to which the playback device 110a belongs (e.g., a household ID). Once the control device 130a receives the response 604, the control device 130 may perform the action 606 and show the media playback system availability. For example, the control device 130a may present, via a GUI, an indication that the media playback system is available, such as displaying a cast icon.

After the control device 130a has detected a media playback system, the control device 130a may receive a request to connect to the media playback system. For example, the control device 130a may detect selection of a cast icon displayed in a GUI. Upon receipt of the request to connect to the playback device 110a, the control device 130a may obtain a first identifier associated with the media playback system, as described above with respect to FIGS. 2-5B. FIG. 7 shows an example message flow between the control device 130a, a playback device 110a that is part of a media playback system, and a computer system 201 where the control device 130a obtains a first identifier. As shown, the message flow comprises first ID requests 702 and 704, a generate first ID action 706, and first ID responses 708 and 710.

The control device 130a may transmit a first ID request 702 to the playback device 110a that requests a first identifier. The playback device 110a may, in turn, transmit a first ID request 704 to the computing system 201. The first ID request 704 may, in some embodiments, contain additional information relative to the first ID request 702. For example, the playback device 110a may incorporate a unique identifier associated with the media playback system to which the playback device 110a belongs, such as a household ID, into the first ID request 704 that may be employed by the computing system 201 to generate the first identifier. Upon receipt of the first ID request by the computing system 201, the computing system may proceed to perform the action 706 to generate the first ID. The computing system may generate the first ID in any of a variety of ways including, for example, those techniques described above with respect to act 504 in FIG. 5. Once the computing system has generated the first ID, the computing system 201 may transmit a first ID response 708 to the playback device 110a. The playback device 110a may, upon receipt of the first ID response 708, transmit the first ID response 710 to the control device 130a.

Figure 8:
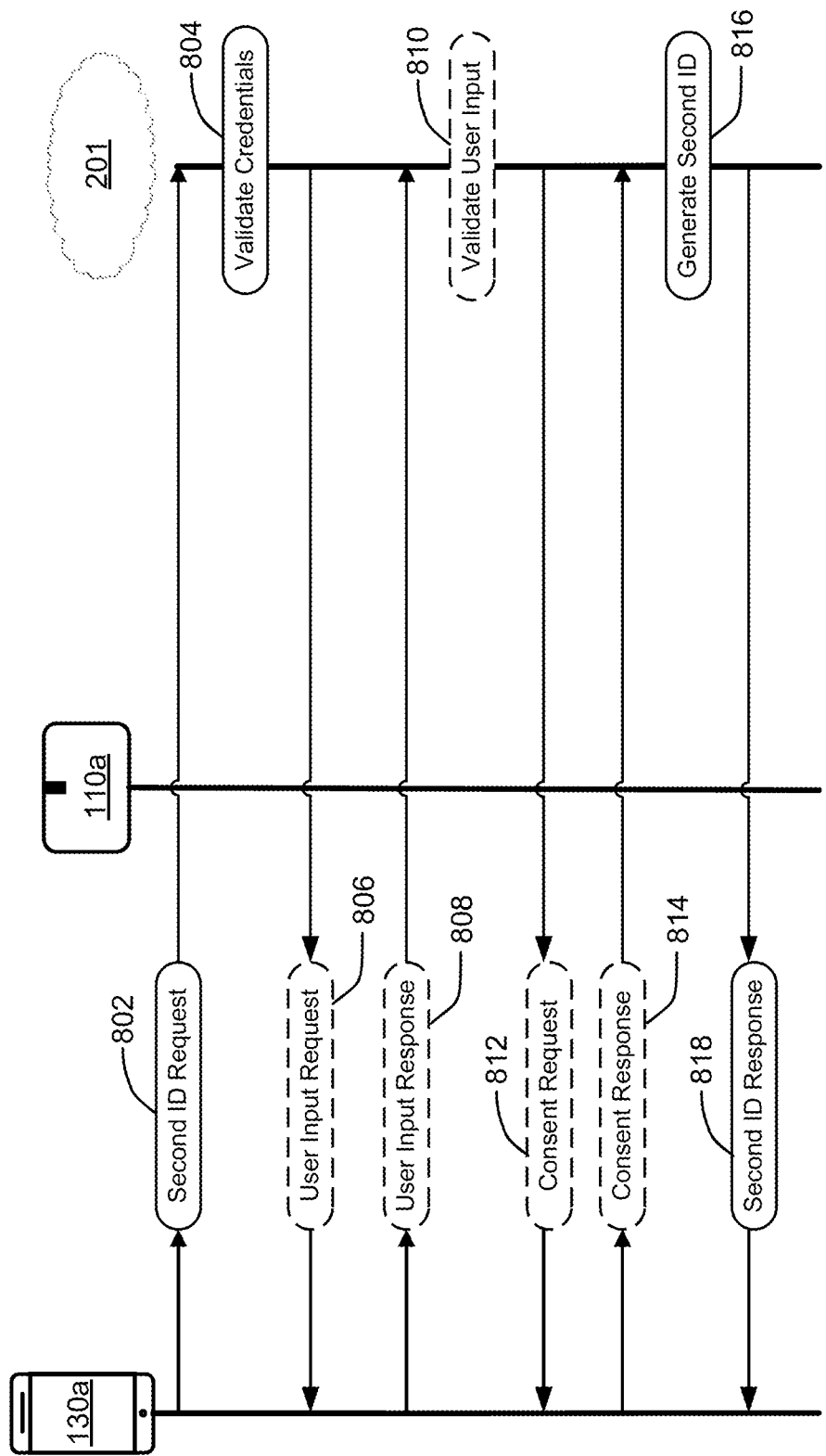
FIG. 8 is a message flow diagram depicting example messages to obtain a second identifier.

After the control device 130a has obtained the first identifier, the control device 130a may obtain a second identifier using the first identifier, as described above with respect to FIGS. 2-5B. FIG. 8 shows an example message flow between the control device 130a, a playback device 110a that is part of a media playback system, and a computer system 201 where the control device 130a obtains a second identifier. As shown, the message flow comprises a second ID request 802, a validate credentials action 804, a request for user input 806, a user input response 808, a validate user input action 810, a consent request 812, a consent response 814, a generate second ID action 816, and a second ID response 818.

The control device 130a may transmit the second ID request 802 to the computing system 201. The second ID request 802 may comprise one or more credentials, such as the first identifier. The computing system 201 may, in turn, validate the credentials in the second ID request 802 in the validate credentials action 804 using, for example, any of the techniques described above in act 510 in FIG. 5. If the credentials in the second ID request 802 are valid, the computing system 201 may transmit a user input request 806 to the control device 130a requesting input from the user, such as user login credentials for an account associated with the user. The user input request 806 may trigger the control device 130a to request input from the user in a GUI. For example, the user input request 806 may include an address (e.g., a URL) for a webpage (e.g., hosted by the computing system 201) that the control device 130a may access via a web browser where the user may input information, such as user login credentials. After the computing device 130a receives the user input, the control device 130a may transmit a user input response 808 to the computing system 201 that comprises the user input. The computing system 201 may, in response to receiving the user input response 808, perform a validate user input action 810. For example, the computing system 201 may determine whether the user account login credentials are valid (e.g., match the account login credentials of a user account) or invalid (e.g., do not match the account login credentials of a user account). Once the user input has been validated, the computer system may transmit a consent request 812 to the control device 130a requesting permission from the user. For example, the computing system 201 may need to make information associated with an account available to a third-party application and/or allow a third-party application to control the media playback system. In this example, the computing system 201 may request permission to make such information and/or access available to a third-party application. The control device 130a may receive input from the user via a GUI regarding whether the user grants the requested permission and transmit the consent response 814. For illustration, the consent request 812 may include an address (e.g., a URL) for a webpage (e.g., hosted by the computing system 201) that the control device 130a may access via a web browser where the user may provide their consent (e.g., click a button indicating that the user provides consent). The computing system 201 may receive the consent response 814 and, responsive to the user providing consent, perform the generate second ID action 816 (e.g., using any of the techniques described above with reference to act 512 in FIG. 5). The computing system 201 may, in turn, transmit a second ID response 818 that includes the second ID to the control device 130a.

It should be appreciated that one or more portions of the message flow shown in FIG. 8 may be omitted without departing from the scope of the present disclosure. For example, in some embodiments, the computing system 201 may not request input from the user (e.g., login credentials for an account). Further, in some embodiments, the computing system 201 may not request consent from the user (e.g., because a third-party application does not need information from the account). Thus, one or more of elements 806, 808, 810, 812, and 814 may be omitted from the message flow in FIG. 8 without departing from the scope of the present disclosure.

Figure 9:
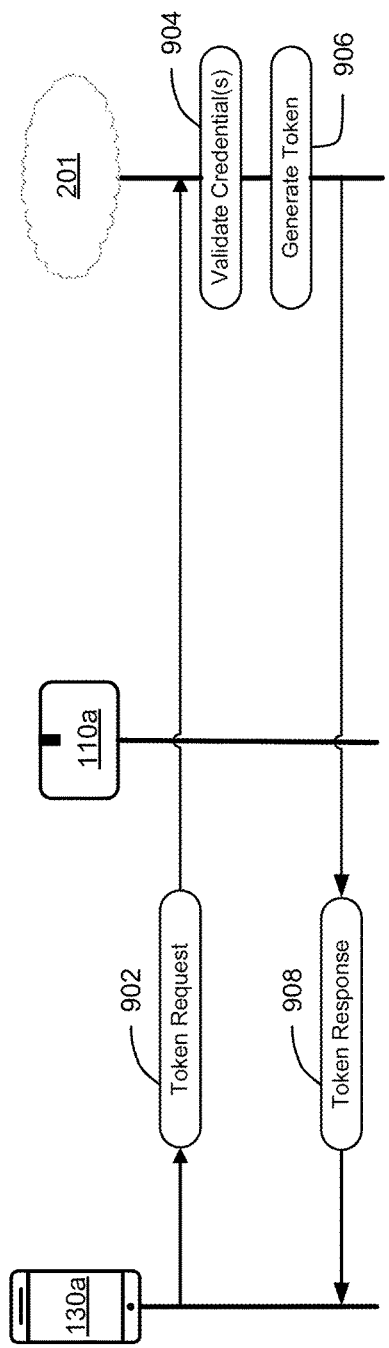
FIG. 9 is a message flow diagram depicting example messages to obtain a token.

After the control device 130*a* has obtained the second identifier, the control device 130*a* may obtain a token using the second identifier (and/or the first identifier), as described above with respect to FIGS. 2-5B. FIG. 9 shows an example message flow between the control device 130*a*, a playback device 110*a* that is part of a media playback system, and a computer system 201 where the control device obtains a token. As shown, the message flow comprises a token request 902, a validate credentials action 904, a generate token action 906, and a token response 908.

The control device 902 transmit a token request 902 to the computing system 201. The token request 902 may comprise one or more credentials such as the second identifier and/or the first identifier. The computing system 201 may, upon receipt of the token request 902, perform a validate credentials action 904 and validate the credentials in the token request (e.g., using any of the techniques described above with reference to act 518 in FIG. 5). If the computing system 201 determines that the credentials are valid, the computing system 201 may perform a generate token action (e.g., using any of the techniques described above with reference to act 518 in FIG. 5) and transmit the token to the control device 130*a* in a token response 908.

Figure 10:
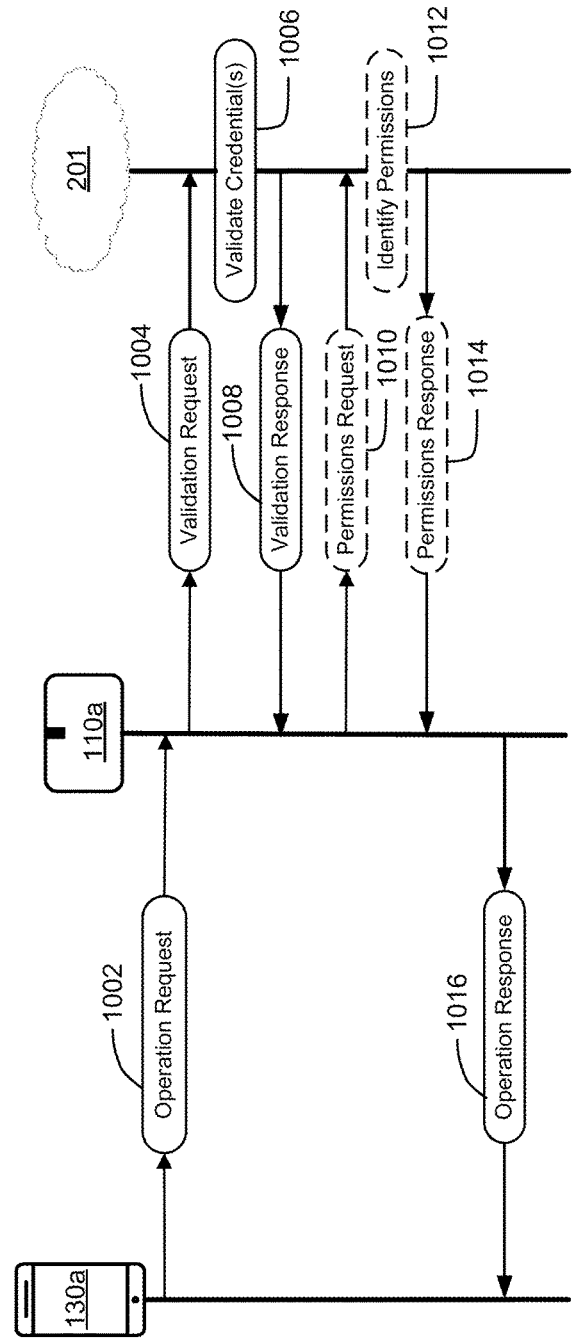
FIG. 10 is a message flow diagram depicting example messages to cause a media playback system to perform an operation.

After the control device 130*a* has obtained the token, the control device 130*a* may receive a request for the media playback system to perform an operation from a user. For example, the control device 130*a* may detect activation of a GUI element for skipping tracks. Upon receiving the request for the media playback system to perform the operation, the control device 130*a* may cause the media playback system to perform the operation using the token, as described above with respect to FIGS. 2-5B. FIG. 10 is an example message flow between the control device 130*a*, a playback device 110*a* that is part of a media playback system, and a computer system 201 where the control device 130*a* causes the media playback system to perform an operation. As shown, the message flow comprises an operation request 1002, a validation request 1004, a validate credentials action 1006, a validation response 1008, a permissions request 1010, an identify permissions operation 1012, a permissions response 1014, and an operation request response 1016.

The control device 130*a* transmit an operation request 1002 to the playback device 110*a*. The operation request 1002 may comprise an indication of an operation and one or more credentials, such as a token. The playback device 110*a* may, in turn, transmit a validation request 1004 that comprises the credentials received from the control device 130*a* (e.g., the token) to the computing system 201 for validation. The computing system 201 may perform a validate credentials action 1006 and validate the credentials (e.g., using any of the techniques described above with reference to act 526 in FIG. 5). The computing system 201 may transmit a validation response 1008 to the playback device 110*a* that includes an indication of whether the credential(s) (e.g., token) are valid. The playback device 110*a* may, in response to the token being valid, transmit a permissions request 1010 to the computing system requesting an indication of the permitted operations associated with the token. The computing system 201 may then perform an identify permissions action 1012 and identify the permitted operations associated with the token. The identified set of permitted operations associated with the token may be transmitted in the permissions response 1014. The playback device 110*a* may use the set of permitted operations received from the computing system 201 to determine whether the operation included in the operation request 1002 is permitted. If the operation is permitted, the playback device 110*a* may perform the operation and provide an indication that the operation was performed in the operation response 1016. Otherwise, the playback device 110*a* may not perform the operation and provide an indication that the operation was not performed in the operation response 1016.

It should be appreciated that one or more portions of the message flow shown in FIG. 10 may be omitted without departing from the scope of the present disclosure. For example, in some embodiments, the playback device 110*a* may not send a permissions request to the computing system 201 (e.g., in architectures where all tokens have the same permissions). Thus, one or more of elements 1010, 1012, and 1014 may be omitted from the message flow in FIG. 10 without departing from the scope of the present disclosure.

Figure 11A:
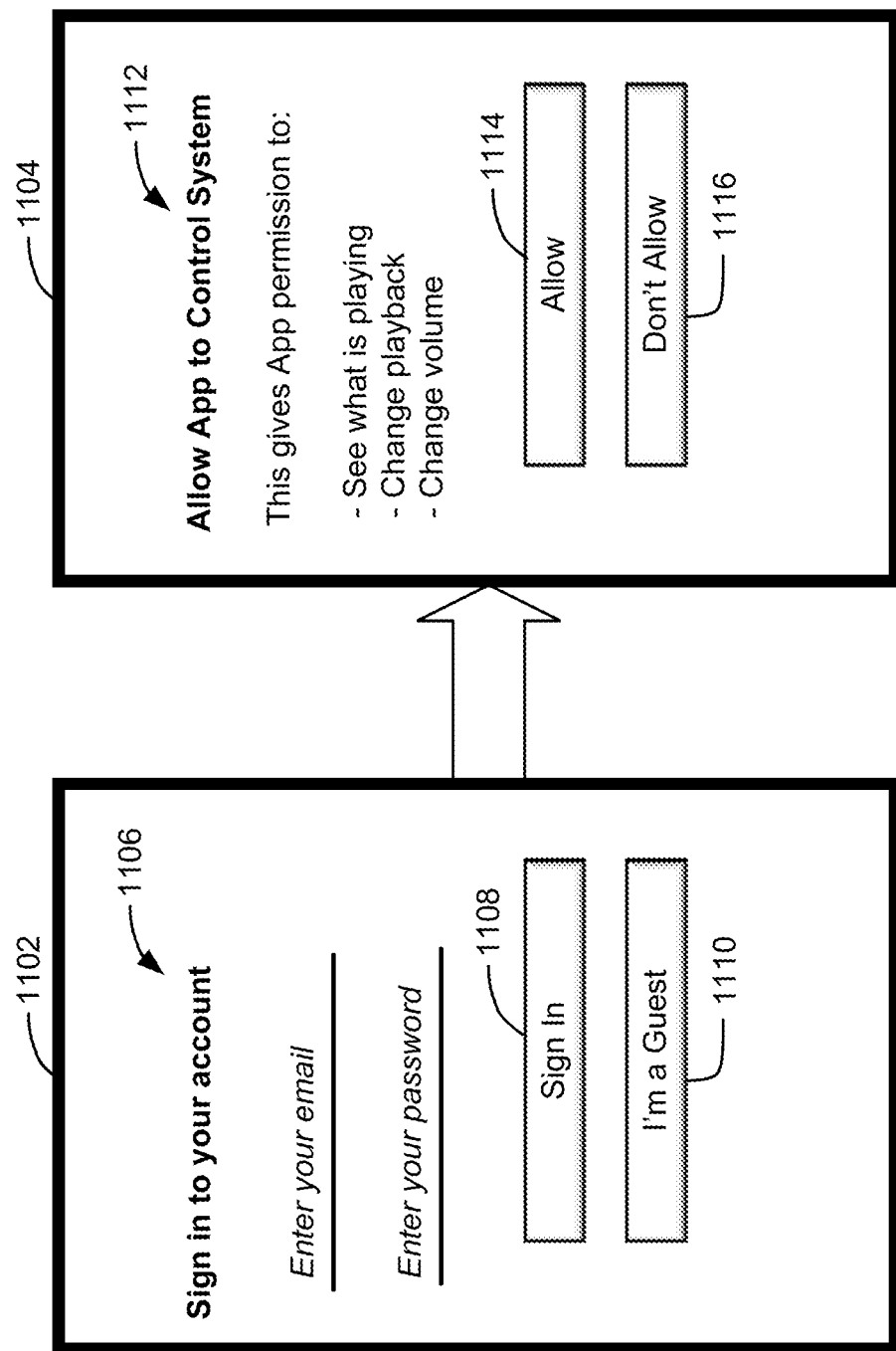
FIGS. 11A and 11B each show an example sequence of user interface screens that may be displayed by a computing device such as the control device in FIG. 2.
Figure 11B:
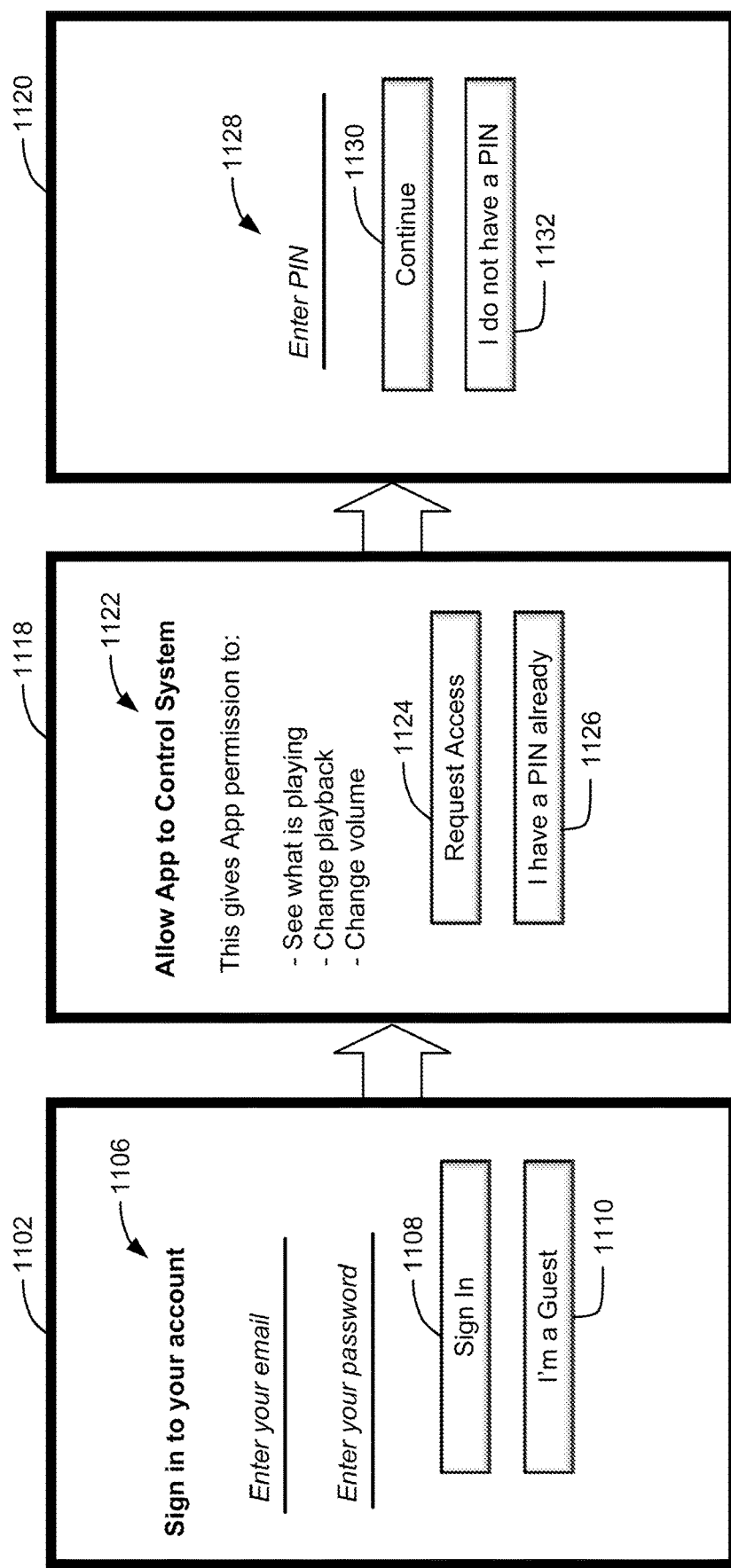

As described above, a computing device (e.g., control device 130*a*) may display one or more user interface screens in a GUI while obtaining access to a media playback system. Example user interface screens that may be presented by the computing device are shown in FIGS. 11A and 11B. Referring to FIG. 11A, a sequence of screens comprising a first screen 1102 and a second screen 1104 is shown. The first screen 1102 may be displayed after, for example, the computing device receives a request to obtain access to a media playback system. As shown, the first screen 1102 comprises a set of input fields 1106 where a user can input login credentials such as an email address and a password associated with an account. The first screen 1102 further comprises a "Sign In" button 1108 that triggers the computing device to submit the login credentials in the set of input fields 1106 to a computing system for validation. A user who, for example, owns the media playback system or is otherwise a registered user (e.g., a registered guest) may input their user login credentials into the set of input fields 1106 to obtain access to the media playback system. Upon activation of the "Sign In" button 1108, the computing device may submit the login credentials in the set of input fields 1106 to a computing system for validation. The computing device may, in turn, receive a response from the computing system indicating that the login credentials are valid and transition to screen 1104. As shown, the second screen 1104 includes a permission request 1112 for a third-party application (shown as "App") to control the media playback system (e.g., request the media playback system to perform operations such as changing playback volume or skipping media in a playback queue). For example, the permission request 1112 may provide a third-party application associated with a media streaming service (e.g., a music streaming service such as SPOTIFY, PANDORA, AMAZON MUSIC) the ability to control playback of media from the media streaming service on the media playback system. The second screen 1104 includes an "Allow" button 1114 that, upon activation, allows the third-party application executed on the computing device to control the media playback system. For example, the computing system may permit the third-party application to request a token (or any other credential) that may be employed to control the media playback system. The screen 1104 further includes a "Don't Allow" button 1116 that, upon activation, does not allow the third-party application to control the media playback system. For example, the computing system may not permit the third-party application to request a token (or any other credential) that may be employed to control the media playback system.

Returning to screen 1102, the screen 1102 further comprises an "I'm a guest" button 1110 that may be activated to obtain anonymous guest access to the media playback system for those individuals who do not have an account. Upon activation of the "I'm a guest" button, the computing device may transition to screen 1118 shown in FIG. 11B. As shown, the screen 1118 includes a permission request 1122 for a third-party application (shown as "App") to control the media playback system. The screen 1118 further includes a "Request Access" button 1124 that may trigger the computing device to request access from the owner of the media playback system. For example, the computing device may send one or more messages to the computing system that, in turn, causes the computing system to transmit a personal identification number (PIN) to the owner of the media playback system. The owner of the media playback system may, in turn, provide the PIN to the guest. The guest may enter the PIN by, for example, activating the "I have a PIN already" button 1126 that triggers the computing device to transition to screen 1120. As shown, screen 1120 comprises an input field 1128 to receive the PIN and a "Continue" button 1130 that triggers the computing device to transmit the PIN from the input field to the computing system for validation to obtain access to the media playback system. The screen 1132 also includes an "I do not have a PIN" button that, upon activation, may cause the computing device to return to screen 1118.

IV. Conclusion

The above discussions relating to playback devices, control devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

Further, the access control techniques described herein may be employed in systems separate and apart from media playback systems such as any Internet of Things (IoT) system. These IoT systems may comprise an IoT device, such as a smart thermostat, a smart doorbell, a smart lock (e.g., a smart door lock), a smart outlet, a smart light, a smart camera, a smart kitchen appliance (e.g., a smart oven, a smart coffee maker, a smart microwave), a smart speaker (including the network accessible and/or voice-enabled playback devices described above), that communicates with cloud servers (e.g., over the Internet) and a computing device (e.g., over a LAN and/or a PAN). For example, with reference to FIGS. 2 and 6-10, the playback device 110a may be replaced with the IoT device, the computing system 201 may be the cloud servers, and the control device 130a may be the computing device. Thus, the access control techniques described herein are not limited to media playback systems.

It should be appreciated that references to transmitting information to particular devices and/or systems herein should be understood to include transmitting information (e.g., messages, requests, responses) indirectly or directly to the particular devices and/or systems. Thus, the information being transmitted to the particular devices and/or systems may pass through any number of intermediary devices and/or systems prior to reaching its destination. For example, a control device may transmit information to a playback device by first transmitting the information to a computing system that, in turn, transmits the information to the playback device. Further, modifications may be made to the information by the intermediary devices. For example, intermediary devices may modify a portion of the information, reformat the information, and/or incorporate additional information.

Similarly, references to receiving information from particular devices and/or systems herein should be understood to include receiving information (e.g., messages, requests, responses) indirectly or directly from the particular devices and/or systems. Thus, the information being received from the particular devices and/or systems may pass through any number of intermediary devices and/or systems prior to being received. For example, a control device may receive information from a playback device indirectly by receiving information from a cloud server that originated from the playback device. Further, modifications may be made to the information by the intermediary devices. For example, intermediary devices may modify a portion of the information, reformat the information, and/or incorporate additional information.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

V. Example Features for Computing Devices (Feature 1) A computing device (e.g., a control device) comprising: one or more network interfaces; one or more processors coupled to the one or more network interfaces; data storage having stored therein instructions executable by the one or more processors to cause the computing device to perform a method comprising: receiving a request to control a media playback system comprising a playback device; after receiving the request to control the media playback system, obtaining access to the media playback system, wherein obtaining access to the media playback system comprises: a) obtaining a first identifier associated with the media playback system; b) obtaining a second identifier using the first identifier, wherein obtaining the second identifier comprises communicating over a wide area network (WAN) (e.g., the Internet) with a computing system; and c) obtaining a token using the second identifier, wherein obtaining the token comprises communicating over the WAN with the computing system; receiving a request for the media playback system to perform an operation; and causing the media playback system to perform the operation using the token.

(Feature 2) The computing device of feature 1, wherein obtaining the first identifier comprises: transmitting a request for the first identifier to the playback device; and receiving the first identifier from the playback device.

(Feature 3) The computing device of feature 1, further comprising a display coupled to the one or more processors and wherein obtaining the first identifier associated with the media playback system comprises: displaying, via the display, a graphical user interface that comprises at least one input field; and receiving the first identifier in the at least one input field.

(Feature 4) The computing device of any of features 1-3, wherein obtaining the second identifier comprises: transmitting the first identifier to the computing system; and receiving the second identifier from the computing system.

(Feature 5) The computing device of feature 4, further comprising a display coupled to the one or more processors and wherein obtaining the second identifier further comprises: displaying, via the display, a graphical user interface that comprises at least one input field; receiving one or more credentials associated with a user in the at least one input field; and transmitting the one or more credentials associated with the user to the computing system.

(Feature 6) The computing device of feature 5, wherein the one or more credentials associated with the user include at least one member selected from the group consisting of: a username, a password, and a biometric (e.g., a fingerprint of a user, a photo of a user).

(Feature 7) The computing device of any of features 1-6, wherein obtaining the token comprises: obtaining the token using the first identifier and the second identifier.

(Feature 8) The computing device of any of features 1-6, wherein obtaining the token comprises: transmitting the second identifier to the computing system; and receiving the token from the computing system.

(Feature 9) The computing device of any of features 1-8, wherein causing the media playback system to perform the operation comprises: transmitting an indication of the operation and the token to the playback device.

(Feature 10) The computing device of any of features 1-9, wherein the operation comprises an operation selected from the group consisting of: playing media, pausing media, increasing volume, decreasing volume, adding media to a playlist, removing media from a playlist, reordering media in a playlist, and skipping media in a playlist.

(Feature 11) The computing device of any of features 1-10, wherein at least one member of the group consisting of: the first identifier, the second identifier, and the token comprises a sequence of characters and wherein the sequence of characters comprises at least one member selected from the group consisting of: a number, a letter, and a symbol.

(Feature 12) A method performed by a computing device (e.g., a control device), the method comprising: receiving a request to control a media playback system comprising a playback device; after receiving the request to control the media playback system, obtaining access to the media playback system, wherein obtaining access to the media playback system comprises: a) obtaining a first identifier associated with the media playback system; b) obtaining a second identifier using the first identifier, wherein obtaining the second identifier comprises communicating over a wide area network (WAN) (e.g., the Internet) with a computing system; and c) obtaining a token using the second identifier, wherein obtaining the token comprises communicating over the WAN with the computing system; receiving a request for the media playback system to perform an operation; and causing the media playback system to perform the operation using the token.

(Feature 13) The method of feature 12, wherein obtaining the first identifier comprises: transmitting a request for the first identifier to the playback device; and receiving the first identifier from the playback device.

(Feature 14) The method of feature 12, wherein obtaining the first identifier associated with the media playback system comprises: displaying, via a display in the computing device, a graphical user interface that comprises at least one input field; and receiving the first identifier in the at least one input field.

(Feature 15) The method of any of features 12-14, wherein obtaining the second identifier comprises: transmitting the first identifier to the computing system; and receiving the second identifier from the computing system.

(Feature 16) The method of feature 15, wherein obtaining the second identifier further comprises: displaying, via a display in the computing device, a graphical user interface that comprises at least one input field; receiving one or more credentials associated with a user in the at least one input field; and transmitting the one or more credentials associated with the user to the computing system.

(Feature 17) The method of any of features 12-16, wherein obtaining the token comprises: obtaining the token using the first identifier and the second identifier.

(Feature 18) The method of any of features 12-16, wherein obtaining the token comprises: transmitting the second identifier to the computing system; and receiving the token from the computing system.

(Feature 19) The method of any of features 12-18, wherein causing the media playback system to perform the operation comprises: transmitting an indication of the operation and the token to the playback device.

(Feature 20) A non-transitory computer readable medium having stored thereon instructions executable by one or more processors of a computing device (e.g., a control device) to cause the one or more processors to perform functions comprising: receiving a request to control a media playback system comprising a playback device; after receiving the request to control the media playback system, obtaining access to the media playback system, wherein obtaining access to the media playback system comprises: a) obtaining a first identifier associated with the media playback system; b) obtaining a second identifier using the first identifier, wherein obtaining the second identifier comprises communicating over a wide area network (WAN) (e.g., the Internet) with a computing system; and c) obtaining a token using the second identifier, wherein obtaining the token comprises communicating over the WAN with the computing system; receiving a request for the media playback system to perform an operation; and causing the media playback system to perform the operation using the token.

VI. Example Features for Media Playback Systems (Feature 1) A media playback system comprising: one or more network interfaces; one or more amplifiers configured to drive one or more speakers; one or more processors coupled to the one or more network interfaces; data storage having stored therein instructions executable by the one or more processors to cause the media playback system to perform a method comprising: receiving a request for a first identifier from a computing device (e.g., a control device); obtaining the first identifier, wherein obtaining the first identifier comprises communicating with a computing system over a wide area network (WAN) (e.g., the Internet); transmitting the first identifier to the computing device; receiving a request to perform an operation and a token from the computing device; determining whether the token is valid; responsive to determining that the token is valid: a) identifying a set of permitted operations associated with the token; b) determining whether the operation is within the set of permitted operations associated with the token; and c) responsive to determining that the operation is within the set of permitted operations associated with the token, performing the operation.

(Feature 2) The media playback system of feature 1, wherein the method further comprises: responsive to determining that the token is invalid or determining that the operation is not within the set of permitted operations: a) not performing the operation; and b) transmitting an indication that the operation was not performed to the computing device.

(Feature 3) The media playback system of any of features 1-2, wherein obtaining the first identifier comprises: transmitting a second identifier associated with the media playback system to the computing system; and receiving the first identifier from the computing system.

(Feature 4) The media playback system of any of features 1-3, wherein determining whether the token is valid comprises: determining whether the token matches at least one token from a set of known valid tokens stored in the data storage; and responsive to determining that the token matches at least one token from the set of known valid tokens, determining that the token is valid.

(Feature 5) The media playback system of feature 4, wherein determining whether the token is valid further comprises: responsive to determining that the token does not match at least one token from the set of known valid tokens: a) transmitting the token to a computing system; and b) receiving an indication of whether the token is valid from the computing system.

(Feature 6) The media playback system of any of features 1-5, wherein identifying the set of permitted operations associated with the token comprises: retrieving from the data storage first permission information comprising permissions for a plurality of tokens; determining whether the token matches at least one token from the plurality of tokens; and responsive to determining that the token matches at least one token from the plurality of tokens, identifying the set of permitted operations associated with the token using the first permission information.

(Feature 7) The media playback system of feature 6, wherein identifying the set of permitted operations associated with the token further comprises: responsive to determining that the token does not match at least one token from the plurality of tokens: a) transmitting the token to the computing system; b) receiving second permissions information from the computing system; and c) identifying the set of permitted operations associated with the token using the second permissions information.

(Feature 8) The media playback system of any of features 1-7, further comprising a playback device including a housing and wherein each of the one or more processors, the one or more amplifiers, and the data storage are carried by the housing.

(Feature 9) The media playback system of any of features 1-7, further comprising a plurality of playback devices, wherein the data storage comprises a plurality of memory modules, and wherein the one or more processors and the plurality of memory modules are distributed among the plurality of playback devices.

(Feature 10) The media playback system of any of features 1-9, wherein the operation comprises an operation selected from the group consisting of: playing media, pausing media, increasing volume, decreasing volume, adding media to a playlist, removing media from a playlist, reordering media in a playlist, and skipping media in a playlist.

(Feature 11) The media playback system of any of features 1-10, wherein at least one member of the group consisting of: the first identifier and the token comprises a sequence of characters and wherein the sequence of characters comprises at least one member selected from the group consisting of: a number, a letter, and a symbol.

(Feature 12) A method performed by a media playback system, the method comprising: receiving a request for a first identifier from a computing device (e.g., a control device); obtaining the first identifier, wherein obtaining the first identifier comprises communicating with a computing system over a wide area network (WAN) (e.g., the Internet); transmitting the first identifier to the computing device; receiving a request to perform an operation and a token from the computing device; determining whether the token is valid; responsive to determining that the token is valid: a) identifying a set of permitted operations associated with the token; b) determining whether the operation is within the set of permitted operations associated with the token; and c) responsive to determining that the operation is within the set of permitted operations associated with the token, performing the operation.

(Feature 13) The method of feature 12, further comprising: responsive to determining that the token is invalid or determining that the operation is not within the set of permitted operations: a) not performing the operation; and b) transmitting an indication that the operation was not performed to the computing device.

(Feature 14) The method of any of features 12-13, wherein obtaining the first identifier comprises: transmitting a second identifier associated with the media playback system to the computing system; and receiving the first identifier from the computing system.

(Feature 15) The method of any of features 12-14, wherein determining whether the token is valid comprises: determining whether the token matches at least one token from a set of known valid tokens stored in the data storage; and responsive to determining that the token matches at least one token from the set of known valid tokens, determining that the token is valid.

(Feature 16) The method of feature 15, wherein determining whether the token is valid further comprises: responsive to determining that the token does not match at least one token from the set of known valid tokens: a) transmitting the token to a computing system; and b) receiving an indication of whether the token is valid from the computing system.

(Feature 17) The method of any of features 12-16, wherein identifying the set of permitted operations associated with the token comprises: retrieving from the data storage first permission information comprising permissions for a plurality of tokens; determining whether the token matches at least one token from the plurality of tokens; and responsive to determining that the token matches at least one token from the plurality of tokens, identifying the set of permitted operations associated with the token using the first permission information.

(Feature 18) The method of feature 17, wherein identifying the set of permitted operations associated with the token further comprises: responsive to determining that the token does not match at least one token from the plurality of tokens: a) transmitting the token to the computing system; b) receiving second permissions information from the computing system; and c) identifying the set of permitted operations associated with the token using the second permissions information.

(Feature 19) The method of any of features 12-18, wherein the operation comprises an operation selected from the group consisting of: playing media, pausing media, increasing volume, decreasing volume, adding media to a playlist, removing media from a playlist, reordering media in a playlist, and skipping media in a playlist.

(Feature 20) A non-transitory computer readable medium having stored thereon instructions executable by one or more processors of a media playback system to cause the one or more processors to perform functions comprising: receiving a request for a first identifier from a computing device (e.g., a control device); obtaining the first identifier, wherein obtaining the first identifier comprises communicating with a computing system over a wide area network (WAN) (e.g., the Internet); transmitting the first identifier to the computing device; receiving a request to perform an operation and a token from the computing device; determining whether the token is valid; responsive to determining that the token is valid: a) identifying a set of permitted operations associated with the token; b) determining whether the operation is within the set of permitted operations associated with the token; and c) responsive to determining that the operation is within the set of permitted operations associated with the token, performing the operation.

VII. Example Features for Computing Systems (Feature 1) A computing system comprising: one or more network interfaces; one or more processors coupled to the one or more network interfaces; data storage having stored therein instructions executable by the one or more processors to cause the computing system to perform a method comprising: receiving, from a media playback system, a first request for a first identifier; processing the first request, wherein processing the first request comprises: a) generating the first identifier; and b) transmitting the first identifier to the media playback system; receiving, from a computing device (e.g., a control device), a second request for a second identifier and one or more first credentials; processing the second request, wherein processing the second request comprises: a) determining whether the one or more first credentials are valid, wherein determining whether the one or more first credentials are valid comprises determining whether the one or more first credentials comprises the first identifier; and b) responsive to determining that the one or more first credentials are valid, generating the second identifier and transmitting the second identifier to the computing device; receiving, from the computing device, a third request for a token to control one or more operations of the media playback system and one or more second credentials; and processing the third request, wherein processing the third request comprises: a) determining whether the one or more second credentials are valid, wherein determining whether the one or more second credentials are valid comprises determining whether the one or more second credentials comprise the second identifier; and b) responsive to determining that the one or more second credentials are valid, generating the token and transmitting the token to the computing device.

(Feature 2) The computing system of feature 1, wherein receiving the request for the first identifier comprises receiving a unique identifier associated with the media playback system and wherein generating the first identifier comprises generating the first identifier using the unique identifier associated with the media playback system.

(Feature 3) The computing system of any of features 1-2, wherein the first identifier has an expiration time after which the first identifier expires and wherein determining whether the one or more first credentials are valid further comprises: determining whether the first identifier has expired; and determining that the one or more first credentials are invalid responsive to determining that the first identifier has expired.

(Feature 4) The computing system of any of features 1-3, wherein determining whether the one or more second credentials are valid comprises: determining whether the one or more second credentials comprises the first identifier.

(Feature 5) The computing system of any of features 1-4, further comprising: receiving, from the media playback system, a fourth request for validation of one or more third credentials; determining whether the one or more third credentials are valid; and transmitting an indication of whether the one or more third credentials are valid.

(Feature 6) The computing system of feature 5, wherein the token has an expiration time after which the token expires, wherein the one or more third credentials comprises the token, and wherein determining whether the one or more third credentials are valid comprises: determining whether the token has expired; and determining that the one or more third credentials are invalid responsive to determining that the token has expired.

(Feature 7) The computing system of any of features 1-6, wherein generating the token comprises: identifying a set of permissions associated with the token; and storing the set of permissions associated with the token in the data storage.

(Feature 8) The computing system of feature 7, further comprising: receiving a fourth request for permission information associated with the token from the media playback system; and responsive to receiving the fourth request, transmitting the set of permissions associated with the token.

(Feature 9) The computing system of any of features 1-8, further comprising a plurality of servers and wherein the one or more processors comprises a plurality of processors distributed among the plurality of servers.

(Feature 10) The computing system of any of features 1-9, wherein the one or more operations comprises an operation selected from the group consisting of: playing media, pausing media, increasing volume, decreasing volume, adding media to a playlist, removing media from a playlist, reordering media in a playlist, and skipping media in a playlist.

(Feature 11) The computing system of any of features 1-10, wherein at least one member of the group consisting of: the first identifier, the second identifier, and the token comprises a sequence of characters and wherein the sequence of characters comprises at least one member selected from the group consisting of: a number, a letter, and a symbol.

(Feature 12) A method performed by a computing system, the method comprising: receiving, from a media playback system, a first request for a first identifier; processing the first request, wherein processing the first request comprises: a) generating the first identifier; and b) transmitting the first identifier to the media playback system; receiving, from a computing device (e.g., a control device), a second request for a second identifier and one or more first credentials; processing the second request, wherein processing the second request comprises: a) determining whether the one or more first credentials are valid, wherein determining whether the one or more first credentials are valid comprises determining whether the one or more first credentials comprise the first identifier; and b) responsive to determining that the one or more first credentials are valid, generating the second identifier and transmitting the second identifier to the computing device; receiving, from the computing device, a third request for a token to control one or more operations of the media playback system and one or more second credentials; and processing the third request, wherein processing the third request comprises: a) determining whether the one or more second credentials are valid, wherein determining whether the one or more credentials are valid comprises determining whether the one or more second credentials comprise the second identifier; and b) responsive to determining that the one or more second credentials are valid, generating the token and transmitting the token to the computing device.

(Feature 13) The method of feature 12, wherein the request for the first identifier comprises a unique identifier associated with the media playback system and wherein generating the first identifier comprises generating the first identifier using the unique identifier associated with the media playback system.

(Feature 14) The method of any of features 12-13, wherein the first identifier has an expiration time after which the first identifier expires and wherein determining whether the one or more first credentials are valid further comprises: determining whether the first identifier has expired; and determining that the one or more first credentials are invalid responsive to determining that the first identifier has expired.

(Feature 15) The method of any of features 12-14, wherein determining whether the one or more second credentials are valid comprises: determining whether the one or more second credentials comprises the first identifier.

(Feature 16) The method of any of features 12-15, further comprising: receiving, from the media playback system, a fourth request for validation of one or more third credentials; determining whether the one or more third credentials are valid; and transmitting an indication of whether the one or more third credentials are valid.

(Feature 17) The method of feature 16, wherein the token has an expiration time after which the token expires, wherein the one or more third credentials comprises the token, and wherein determining whether the one or more third credentials are valid comprises: determining whether the token has expired; and determining that the one or more third credentials are invalid responsive to determining that the token has expired.

(Feature 18) The method of any of features 12-17, wherein generating the token comprises: identifying a set of permissions associated with the token; and storing the set of permissions associated with the token in data storage.

(Feature 19) The method of feature 18, further comprising: receiving, from the media playback system, a fourth request for permission information associated with the token; and responsive to receiving the fourth request, transmitting the set of permitted operations associated with the token.

(Feature 20) A non-transitory computer readable medium having stored thereon instructions executable by one or more processors of a computing system to cause the one or more processors to perform functions comprising: receiving, from a media playback system, a first request for a first identifier; processing the first request, wherein processing the first request comprises: a) generating the first identifier; and b) transmitting the first identifier to the media playback system; receiving, from a computing device (e.g., a control device), a second request for a second identifier and one or more first credentials; processing the second request, wherein processing the second request comprises: a) determining whether the one or more first credentials are valid, wherein determining whether the one or more first credentials are valid comprises determining whether the one or more first credentials comprise the first identifier; and b) responsive to determining that the one or more first credentials are valid, generating the second identifier and transmitting the second identifier to the computing device; receiving, from the computing device, a third request for a token to control one or more operations of the media playback system and one or more second credentials; and processing the third request, wherein processing the third request comprises: a) determining whether the one or more second credentials are valid, wherein determining whether the one or more second credentials are valid comprises determining whether the one or more second credentials comprise the second identifier; and b) responsive to determining that the one or more second credentials are valid, generating the token and transmitting the token to the computing device.

We claim:
1. A playback device comprising:
one or more amplifiers configured to drive one or more speakers;
one or more network communications interfaces;
at least one processor;
a housing carrying the one or more amplifiers, the one or more network communications interfaces; and the at least one processor; and
at least one non-transitory computer-readable medium comprising program instructions that are executable by the at least one processor such that the playback device is configured to:
receive, via the one or more network communications interfaces from a computing device, a request for a first identifier;
obtain the first identifier;
transmit, via the one or more network communications interfaces to the computing device in response to the received request, the first identifier;
receive, via the one or more network communications interfaces from the computing device, (1) a request to perform an operation and (2) a token, wherein the token is generated by a computing system when one or more credentials received by the computing sys- tem from the computing device are determined to be valid based on the one or more credentials including the first identifier;

determine that the token is valid;

responsive to the determination that the token is valid, identify a set of permitted operations associated with the token;

determine that the operation is within a set of permitted operations associated with the token; and responsive to the determination that the operation is within the set of permitted operations associated with the token, perform the operation.

2. The playback device of claim 1, wherein the program instructions that are executable by the at least one processor such that the playback device is configured to obtain the first identifier comprise program instructions that are executable by the at least one processor such that the playback device is configured to:

generate the first identifier using a unique identifier associated with the playback device, wherein at least one non-transitory computer readable medium further comprises program instructions that are executable by the at least one processor such that the playback device is configured to:

transmit, via the one or more network communications interfaces to a computing system, the first identifier.

3. The playback device of claim 1, wherein the program instructions that are executable by the at least one processor such that the playback device is configured to obtain the first identifier comprise program instructions that are executable by the at least one processor such that the playback device is configured to:

transmit, via the one or more network communications interfaces to the computing system, a request for the first identifier; and receive, via the one or more network communications interfaces from the computing system in response to the request, the first identifier.

4. The playback device of claim 1, wherein the program instructions that are executable by the at least one processor such that the playback device is configured to determine that the token is valid comprise program instructions that are executable by the at least one processor such that the playback device is configured to:

determine that the token matches at least one token from a set of known valid tokens stored in data storage; and determine that the token is valid based on the determination that the token matches at least one token from a set of known valid tokens stored in the data storage.

5. The playback device of claim 1, wherein the at least one non-transitory computer readable medium further comprises program instructions that are executable by the at least one processor such that the playback device is configured to:

receive, via the one or more network communications interfaces from the computing device, (1) a request to perform an additional operation and (2) an additional token;

determine that the additional token is invalid; and responsive to determining that the additional token is invalid: (1) forego performance of the additional operation and (2) transmit, via the one or more network communications interfaces, an indication that the additional token is invalid.

6. The playback device of claim 5, wherein the program instructions that are executable by the at least one processor such that the playback device is configured to determine that the additional token is invalid comprise program instructions that are executable by the at least one processor such that the playback device is configured to:

determine that the additional token does not match at least one token from a set of known valid tokens stored in data storage, wherein at least one non-transitory computer readable medium further comprises program instructions that are executable by the at least one processor such that the playback device is configured to:

responsive to the determination that the additional token does not match at least one token from the set of known valid tokens stored in data storage, transmit, via the one or more network communications interfaces to the computing system, the additional token;

receive, via the one or more network communications interfaces from the computing system, additional permissions information; and identify the set of permitted operations associated with the additional token using the additional permissions information.

7. The playback device of claim 1, wherein the at least one non-transitory computer readable medium further comprises program instructions that are executable by the at least one processor such that the playback device is configured to:

receive, via the one or more network communications interfaces from the computing device, (1) a request to perform an additional operation and (2) the token;

determine that the token is valid;

responsive to the determination that the token is valid, identify a set of permitted operations associated with the token;

determine that the additional operation is not within the set of permitted operations associated with the token; and responsive to the determination that the operation is not within the set of permitted operations associated with the token: (1) forego performance of the additional operation and (2) transmit, via the one or more network communications interfaces, an indication that the token is invalid.

8. The playback device of claim 1, wherein the operation comprises an operation selected from the group consisting of: playing media, pausing media, increasing volume, decreasing volume, adding media to a playlist, removing media from a playlist, reordering media in a playlist, and skipping media in a playlist.

9. A tangible, non-transitory computer-readable medium comprising program instructions that are executable by at least one processor such that a playback device is configured to:

receive, via one or more network communications interfaces from a computing device, a request for a first identifier;

obtain the first identifier;

transmit, via the one or more network communications interfaces to the computing device in response to the received request, the first identifier;

receive, via the one or more network communications interfaces from the computing device, (1) a request to perform an operation and (2) a token, wherein the token is generated by a computing system when one or more credentials received by the computing system from the computing device are determined to be valid based on the one or more credentials including the first identifier;

determine that the token is valid;

responsive to the determination that the token is valid, identify a set of permitted operations associated with the token;

determine that the operation is within a set of permitted operations associated with the token; and responsive to the determination that the operation is within the set of permitted operations associated with the token, perform the operation.

10. The tangible, non-transitory computer-readable medium of claim 9, wherein the program instructions that are executable by the at least one processor such that the playback device is configured to obtain the first identifier comprise program instructions that are executable by the at least one processor such that the playback device is configured to:

generate the first identifier using a unique identifier associated with the playback device, wherein at least one non-transitory computer readable medium further comprises program instructions that are executable by the at least one processor such that the playback device is configured to:

transmit, via the one or more network communications interfaces to a computing system, the first identifier.

11. The tangible, non-transitory computer-readable medium of claim 9, wherein the program instructions that are executable by the at least one processor such that the playback device is configured to obtain the first identifier comprise program instructions that are executable by the at least one processor such that the playback device is configured to:

transmit, via the one or more network communications interfaces to the computing system, a request for the first identifier; and receive, via the one or more network communications interfaces from the computing system in response to the request, the first identifier.

12. The tangible, non-transitory computer-readable medium of claim 9, wherein the program instructions that are executable by the at least one processor such that the playback device is configured to determine that the token is valid comprise program instructions that are executable by the at least one processor such that the playback device is configured to:

determine that the token matches at least one token from a set of known valid tokens stored in data storage; and determine that the token is valid based on the determination that the token matches at least one token from a set of known valid tokens stored in the data storage.

13. The tangible, non-transitory computer-readable medium of claim 9, wherein the non-transitory computer readable medium further comprises program instructions that are executable by the at least one processor such that the playback device is configured to:

receive, via the one or more network communications interfaces from the computing device, (1) a request to perform an additional operation and (2) an additional token;

determine that the additional token is invalid; and responsive to determining that the additional token is invalid: (1) forego performance of the additional operation and (2) transmit, via the one or more network communications interfaces, an indication that the additional token is invalid.

14. The tangible, non-transitory computer-readable medium of claim 13, wherein the program instructions that are executable by the at least one processor such that the playback device is configured to determine that the additional token is invalid comprise program instructions that are executable by the at least one processor such that the playback device is configured to:

determine that the additional token does not match at least one token from a set of known valid tokens stored in data storage, wherein at least one non-transitory computer readable medium further comprises program instructions that are executable by the at least one processor such that the playback device is configured to:

responsive to the determination that the additional token does not match at least one token from the set of known valid tokens stored in data storage, transmit, via the one or more network communications interfaces to the computing system, the additional token;

receive, via the one or more network communications interfaces from the computing system, additional permissions information; and identify the set of permitted operations associated with the additional token using the additional permissions information.

15. The tangible, non-transitory computer-readable medium of claim 9, wherein the non-transitory computer readable medium further comprises program instructions that are executable by the at least one processor such that the playback device is configured to:

receive, via the one or more network communications interfaces from the computing device, (1) a request to perform an additional operation and (2) the token;

determine that the token is valid;

responsive to the determination that the token is valid, identify a set of permitted operations associated with the token;

determine that the additional operation is not within the set of permitted operations associated with the token; and responsive to the determination that the operation is not within the set of permitted operations associated with the token: (1) forego performance of the additional operation and (2) transmit, via the one or more network communications interfaces, an indication that the token is invalid.

16. The tangible, non-transitory computer-readable medium of claim 9, wherein the operation comprises an operation selected from the group consisting of: playing media, pausing media, increasing volume, decreasing volume, adding media to a playlist, removing media from a playlist, reordering media in a playlist, and skipping media in a playlist.

17. A method to be performed by a playback device, the method comprising:

receiving, via one or more network communications interfaces from a computing device, a request for a first identifier;

obtaining the first identifier;

transmitting, via the one or more network communications interfaces to the computing device in response to the received request, the first identifier;

receiving, via the one or more network communications interfaces from the computing device, (1) a request to perform an operation and (2) a token, wherein the token is generated by a computing system when one or more credentials received by the computing system from the computing device are determined to be valid based on the one or more credentials including the first identifier;

determining that the token is valid;

responsive to determining that the token is valid, identifying a set of permitted operations associated with the token;

determining that the operation is within a set of permitted operations associated with the token; and responsive to determining that the operation is within the set of permitted operations associated with the token, performing the operation.

18. The method of claim 17, wherein obtaining the first identifier comprises:

generating the first identifier using a unique identifier associated with the playback device, wherein the method further comprises:
transmitting, via the one or more network communications interfaces to a computing system, the first identifier.

19. The method of claim 17, wherein obtaining the first identifier comprises:

transmitting, via the one or more network communications interfaces to the computing system, a request for the first identifier; and receiving, via the one or more network communications interfaces from the computing system in response to the request, the first identifier.

20. The method of claim 17, wherein determining that the token is valid comprises:

determining that the token matches at least one token from a set of known valid tokens stored in data storage; and determining that the token is valid based on the determination that the token matches at least one token from a set of known valid tokens stored in the data storage.

* * * * *